(12) United States Patent
Ichikawa et al.

(10) Patent No.: US 11,575,802 B2
(45) Date of Patent: Feb. 7, 2023

(54) COMMUNICATION APPARATUS AND PRINTER FOR PERFORMING WIRELESS COMMUNICATION OF IMAGE DATA REPRESENTING IMAGE OF PRINT TARGET

(71) Applicant: Brother Kogyo Kabushiki Kaisha, Nagoya (JP)

(72) Inventors: Kazuki Ichikawa, Gamagori (JP); Takanobu Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/531,882

(22) Filed: Nov. 22, 2021

(65) Prior Publication Data

US 2022/0086305 A1    Mar. 17, 2022

Related U.S. Application Data

(63) Continuation of application No. 15/405,869, filed on Jan. 13, 2017, now Pat. No. 11,184,503, which is a
(Continued)

(30) Foreign Application Priority Data

Jan. 9, 2014 (JP) ................................ 2014-002188

(51) Int. Cl.
*H04N 1/327*     (2006.01)
*H04N 1/00*      (2006.01)
*G06F 3/12*      (2006.01)

(52) U.S. Cl.
CPC ....... *H04N 1/32795* (2013.01); *G06F 3/1211* (2013.01); *G06F 3/1236* (2013.01);
(Continued)

(58) Field of Classification Search
CPC .......... H04N 1/32795; H04N 1/00307; H04N 1/32776; H04N 1/32786;
(Continued)

(56) References Cited

U.S. PATENT DOCUMENTS 7,493,582 B2   2/2009   Komaki
7,800,770 B2   9/2010   Nakanishi et al.
(Continued)

FOREIGN PATENT DOCUMENTS

| JP | 2007-166538 A | 6/2007 |
| JP | 2010-178002 A | 8/2010 |
| JP | 2011-146991 A | 7/2011 |

OTHER PUBLICATIONS

Nov. 6, 2014—U.S. Non-Final Office Action—U.S. Appl. No. 14/038,450.
(Continued)

*Primary Examiner* — Nicholas Pachol
(74) *Attorney, Agent, or Firm* — Banner & Witcoff, Ltd.

(57) ABSTRACT

A communication apparatus may perform: communicating a wireless setting value with a printer via a first wireless communication interface, establishing the wireless connection with the printer via a second wireless communication interface using the wireless setting value; sending first image data representing a first image of a print target to the printer via the second wireless communication interface using the wireless connection; determining, after the first image data is sent to the printer, whether an apparatus-side disconnection condition is satisfied; disconnecting the wireless connection when it is determined that the apparatus-side disconnection condition is satisfied; and sending, when it is determined that the apparatus-side disconnection condition is not satisfied, second image data representing a second
(Continued)

image of a print target to the printer via the second wireless communication interface using the wireless connection.

20 Claims, 12 Drawing Sheets

Related U.S. Application Data continuation of application No. 14/593,548, filed on Jan. 9, 2015, now Pat. No. 9,575,699.

(52) U.S. Cl.
CPC ....... *G06F 3/1292* (2013.01); *H04N 1/00307* (2013.01); *H04N 1/32776* (2013.01); *H04N 1/32786* (2013.01); *H04N 2201/006* (2013.01); *H04N 2201/0013* (2013.01); *H04N 2201/0017* (2013.01); *H04N 2201/0031* (2013.01); *H04N 2201/0094* (2013.01)

(58) Field of Classification Search
CPC ... H04N 2201/0013; H04N 2201/0017; H04N 2201/0031; H04N 2201/006; H04N 2201/0094
See application file for complete search history.

(56) References Cited

U.S. PATENT DOCUMENTS

| 9,575,699 | B2 | 2/2017 | Ichikawa et al. |
| 2009/0052344 | A1 | 2/2009 | Fujii |
| 2010/0268801 | A1 | 10/2010 | Yukimasa |
| 2011/0026068 | A1 | 2/2011 | Yoshida |
| 2011/0122434 | A1 | 5/2011 | Kim |
| 2011/0177780 | A1 | 7/2011 | Sato et al. |
| 2011/0194147 | A1 | 8/2011 | Kato |
| 2011/0237241 | A1 | 9/2011 | Nagasaki |
| 2011/0320611 | A1 | 12/2011 | Inada et al. |
| 2012/0274972 | A1 | 11/2012 | Nishikawa |
| 2013/0083348 | A1 | 4/2013 | Yamada |
| 2013/0239014 | A1 | 9/2013 | Patil |
| 2013/0260683 | A1 | 10/2013 | Suzuki et al. |
| 2014/0075075 | A1 | 3/2014 | Morrill et al. |
| 2014/0085675 | A1 | 3/2014 | Watanabe |
| 2014/0368867 | A1 | 12/2014 | Kim et al. |

OTHER PUBLICATIONS

"Wi-Fi Peer-to-Peer (P2P) Technical Specification, Version 1.1", Wi-Fi Alliance Technical Committee P2P Task Group, 2010, 159 pages.
Feb. 20, 2015—U.S. Notice of Allowance—U.S. Appl. No. 14/038,450.

(First Embodiment)

(Modification 4)

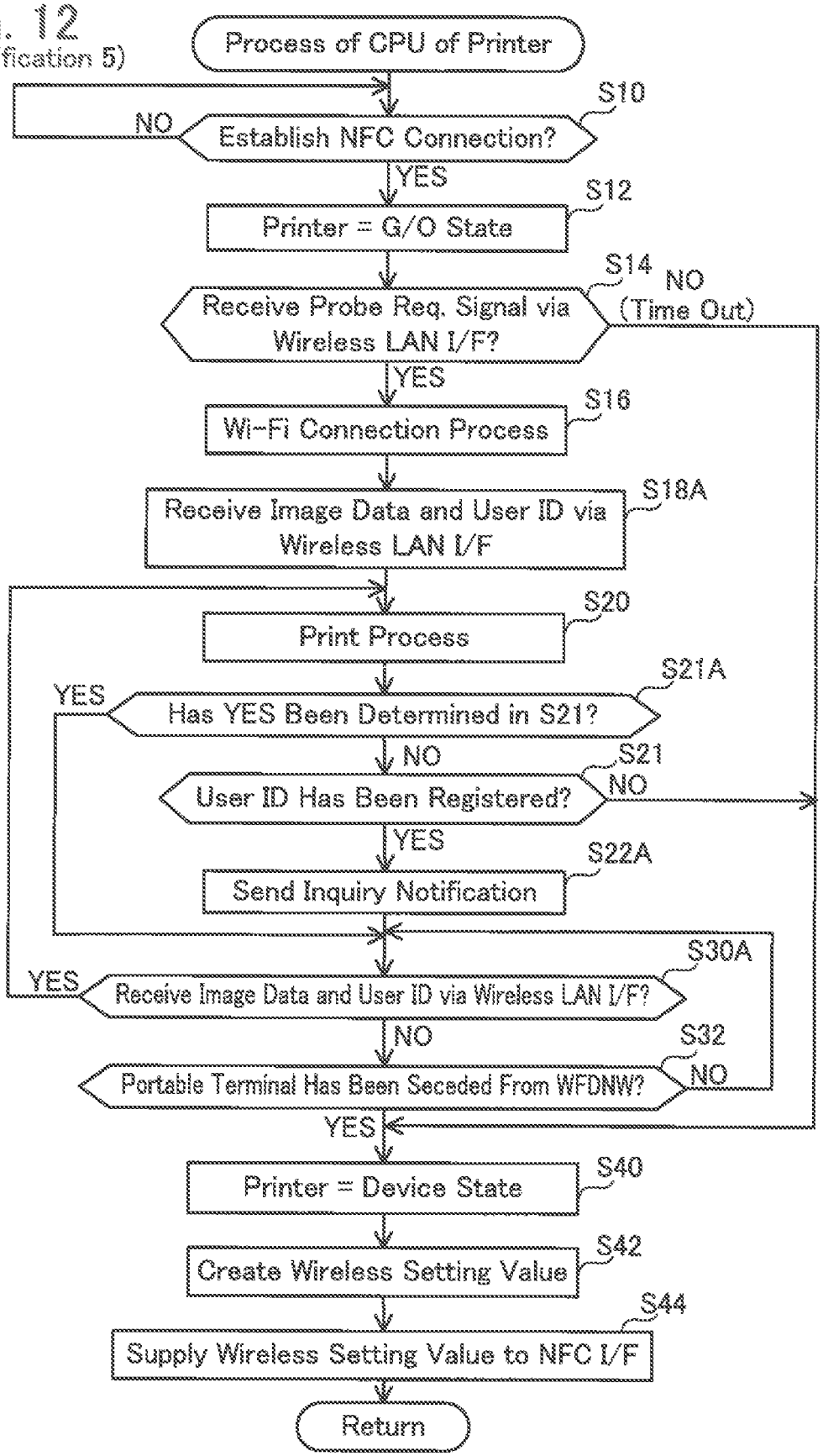

COMMUNICATION APPARATUS AND PRINTER FOR PERFORMING WIRELESS COMMUNICATION OF IMAGE DATA REPRESENTING IMAGE OF PRINT TARGET

CROSS-REFERENCE TO RELATED APPLICATIONS

This application is a continuation of prior U.S. application Ser. No. 15/405,869, filed Jan. 13, 2017, which is a continuation of prior U.S. application Ser. No. 14/593,548, filed Jan. 9, 2015, issued Feb. 21, 2017 as U.S. Pat. No. 9,575,699 B2, which claims priority to Japanese Patent Application No. 2014-002188, filed on Jan. 9, 2014, the contents of which are hereby incorporated by reference into the present application.

TECHNICAL FIELD

The present specification discloses a technique for performing a wireless communication of data between a communication apparatus and a printer.

DESCRIPTION OF RELATED ART

A system is known comprising an initiator and a target, the initiator being a data sending side wireless communication apparatus, and the target being a data receiving side wireless communication apparatus. If the size of the data to be sent to the target is equal to or less than a threshold value, the initiator sends the data to the target using an NFC. On the other hand, if the size of the data to be sent to the target is greater than the threshold value, the initiator hands over the communication scheme from NFC to Bluetooth (registered trademark), and sends the data to the target using a Bluetooth (registered trademark) wireless connection. After finishing sending the data, the initiator disconnects the wireless connection.

SUMMARY

In the technique described above, after handing over the communication scheme from NFC to Bluetooth (registered trademark) and finishing the sending of the data, the initiator invariably disconnects the wireless connection. However, a situation may exist in which the wireless connection should continue.

The present specification provides a technique allowing appropriate processing to be performed after a wireless communication interface has been changed and communication of image data has been performed.

The present specification discloses a non-transitory computer-readable recording medium storing computer-readable instructions for a communication apparatus. The computer-readable instructions, when executed by a processor of the communication apparatus, may cause the communication apparatus to perform: communicating a wireless setting value with a printer via a first wireless communication interface of the communication apparatus, the wireless setting value being for establishing a wireless connection with the printer via a second wireless communication interface of the communication apparatus, the second wireless communication interface being different from the first wireless communication interface; establishing the wireless connection with the printer via the second wireless communication interface using the wireless setting value; sending first image data representing a first image of a print target to the printer via the second wireless communication interface using the wireless connection; determining, after the first image data is sent to the printer, whether an apparatus-side disconnection condition is satisfied, the apparatus-side disconnection condition being predetermined as a condition for disconnecting the wireless connection; disconnecting the wireless connection when it is determined that the apparatus-side disconnection condition is satisfied; and sending, when it is determined that the apparatus-side disconnection condition is not satisfied, second image data representing a second image of a print target to the printer via the second wireless communication interface using the wireless connection.

The present specification discloses a printer comprising: a first wireless communication interface; a second wireless communication interface which is different from the first wireless communication interface; a print performing unit; a processor; and a memory storing computer-readable instructions therein. The computer-readable instructions, when executed by the processor, may cause the printer to perform: communicating a wireless setting value with a communication apparatus via the first wireless communication interface, the wireless setting value being for establishing a wireless connection with the communication apparatus via the second wireless communication interface; establishing the wireless connection with the communication apparatus via the second wireless communication interface using the wireless setting value; receiving first image data from the communication apparatus via the second wireless communication interface using the wireless connection; causing the print performing unit to perform a print of a first image represented by the first image data; determining, after the first image data is received from the communication apparatus, whether an printer-side disconnection condition is satisfied, the printer-side disconnection condition being predetermined as a condition for disconnecting the wireless connection; disconnecting the wireless connection when it is determined that the printer-side disconnection condition is satisfied; receiving, when it is determined that the printer-side disconnection condition is not satisfied, second image data from the communication apparatus via the second wireless communication interface using the wireless connection; and causing the print performing unit to perform a print of a second image represented by the second image data.

The above communication apparatus itself is also novel and useful. Moreover, a communication system comprising the communication apparatus and the printer is also novel and useful. Furthermore, a control method for implementation of the communication apparatus and/or the printer, is also novel and useful. Furthermore, a non-transitory computer-readable recording medium in which computer-readable instructions for implementation of the printer are stored, is also novel and useful.

BRIEF DESCRIPTION OF THE DRAWINGS

FIG. 12 illustrates a flowchart of a process of a CPU of a printer of a modification.

EMBODIMENT

First Embodiment (Configuration of Communication System 2)

Figure 1:
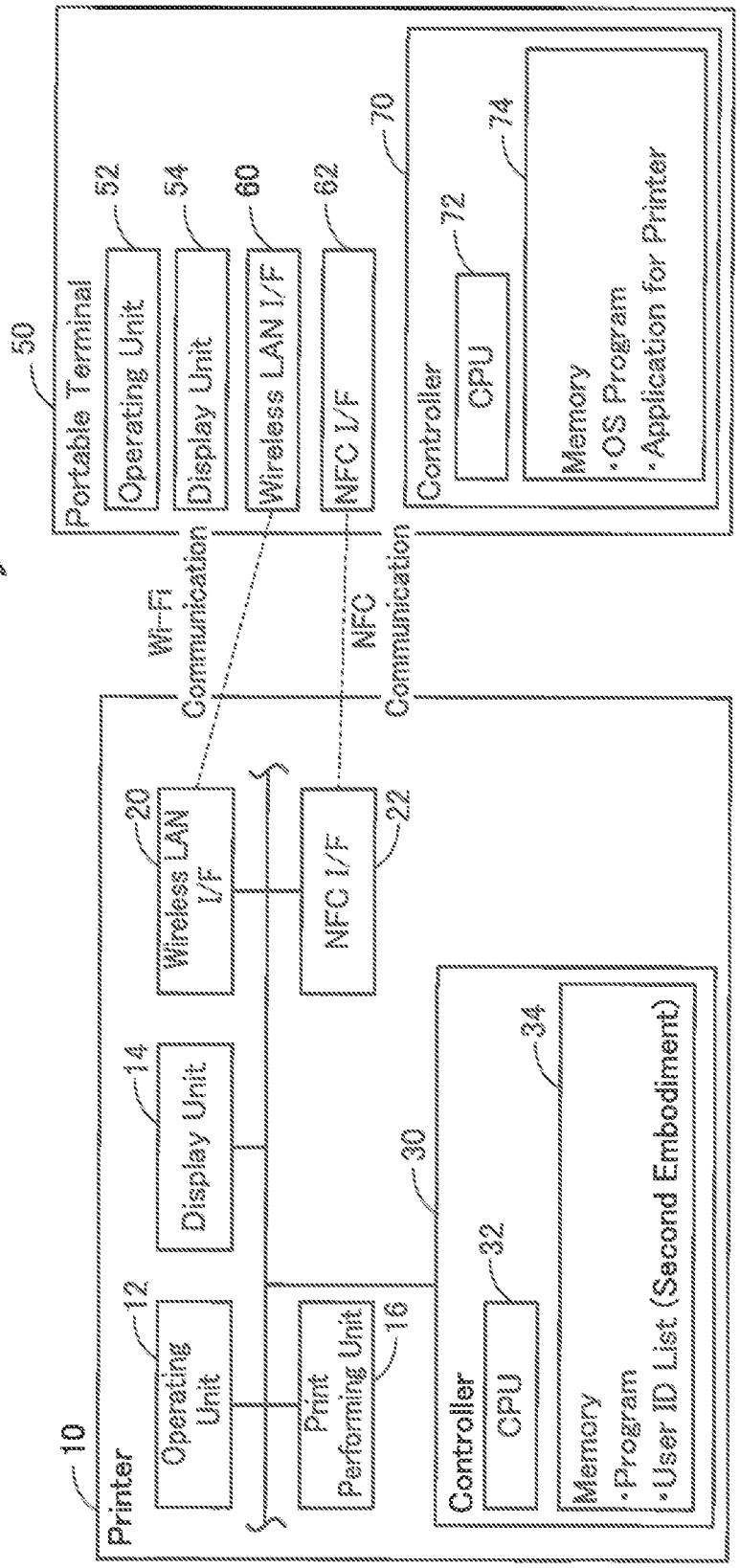
FIG. 1 illustrates a configuration of a communication system.

As illustrated in FIG. 1, a communication system 2 comprises a printer 10 and a portable terminal 50. Each of the printer 10 and the portable terminal 50 can perform an NFC scheme wireless communication (i.e., NFC communication), this being a communication scheme of the NFC (abbreviation of Near Field Communication) standard and, further, can perform a Wi-Fi scheme wireless communication (i.e., Wi-Fi communication), this being a communication scheme developed by Wi-Fi Alliance.

(Configuration of Printer 10)

The printer 10 is a peripheral apparatus (i.e., peripheral apparatus of a PC (abbreviation of Personal Computer) or the like) which can perform a print function. The printer 10 comprises an operating unit 12, a display unit 14, a print performing unit 16, a wireless LAN (abbreviation of Local Area Network) interface 20, an NFC interface 22, and a controller 30. Hereinafter, the interface will be described as "I/F".

The operating unit 12 comprises a plurality of keys. A user can input various instructions to the printer 10 by operating the operating unit 12. The display unit 14 is a display for displaying various pieces of information. The print performing unit 16 is a printing mechanism such as an ink jet printing or a laser printing method.

The wireless LAN I/F 20 is an interface for performing a Wi-Fi scheme wireless communication. The Wi-Fi scheme, for example, is a wireless communication scheme in accordance with the standard of 802.11 of IEEE (abbreviation of The Institute of Electrical and Electronics Engineers, Inc.) or a standard (e.g., 802.11a, 11b, 11g, 11n, etc.) equivalent to this standard.

More specifically, the wireless LAN I/F 20 supports the WFD (abbreviation of Wi-Fi Direct) scheme developed by Wi-Fi Alliance. Consequently, the controller 30 can perform a Wi-Fi communication via the wireless LAN I/F 20 using a WFD scheme wireless network (called "WFDNW" below). Details of the WFD scheme are described in "Wi-Fi Peer-to-Peer (P2P) Technical Specification Version 1.1." created by the Wi-Fi Alliance. Further, details of the WFD scheme are disclosed in US Patent Application No. 2013/0260683, and are cited by reference to the literature.

The NFC I/F 22 is an interface for performing an NFC scheme wireless communication. The NFC scheme, for example, is a wireless communication scheme in accordance with the international standard of, e.g., ISO/IEC 21481 or ISO/IEC 18092. The NFC I/F 22 is an I/F called an NFC Forum Tag (NFC Forum Tag), and functions as an IC tag of the NFC standard. The NFC I/F 22 comprises a RAM, and can store information supplied from the controller 30. Moreover, in a modification, the NFC I/F 22 may be an I/F called an NFC forum device capable of operating in at least one of P2P mode, Reader/Writer mode, and CE mode.

The wireless LAN I/F 20 and the NFC I/F 22 are constituted by physically different chips. A communication speed of a wireless communication via the wireless LAN I/F 20 (e.g., a maximum communication speed is 11 to 600 Mbps) is faster than a communication speed of a wireless communication via the NFC I/F 22 (e.g., a maximum communication speed is 106 to 424 Kbps). A frequency of a carrier wave (e.g., a 2.4 GHz band, a 5.0 GHz band) upon a wireless communication via the wireless LAN I/F 20 is different from a frequency of a carrier wave (e.g. a 13.56 MHz band) upon a wireless communication via the NFC I/F 22. Further, a maximum distance (e.g., 100 m) at which a wireless communication can be performed via the wireless LAN I/F 20 is greater than a maximum distance (e.g., 10 cm) at which a wireless communication can be performed via the NFC I/F 22.

The controller 30 comprises a CPU 32 and a memory 34. The CPU 32 is a processor which performs various processes in accordance with a program stored in the memory 34. Moreover, in FIG. 1, the memory 34 further stores a user ID list. However, the user ID list is used in a second embodiment, described below.

(Configuration of Portable Terminal 50)

The portable terminal 50 is a portable terminal device such as a mobile telephone (e.g. a smartphone), a PDA, a notebook PC, a tablet PC, a portable music playback device or a portable movie playback device. The portable terminal 50 comprises an operating unit 52, a display unit 54, a wireless LAN I/F 60, an NFC I/F 62 and a controller 70.

The operating unit 52 comprises a plurality of keys. The user can give various instructions to the portable terminal 50 by operating the operating unit 52. The display unit 54 is a display for displaying various pieces of information. The wireless LAN I/F 60 and the NFC I/F 62 are the same as the wireless LAN I/F 20 and the NFC I/F 22 of the printer 10, respectively.

The controller 70 comprises a CPU 72 and a memory 74. The CPU 72 is a processor which performs various processes in accordance with a program stored in the memory 74. The program includes an OS (abbreviation of Operation System) program, and a printer application. Below, the application is abbreviated to "appl.".

The printer appl. is a program for causing the printer 10 to perform a print function. The printer appl. may be installed to the portable terminal 50 from a server on the Internet or may be installed to the portable terminal 50 from a medium shipped together with the printer 10.

(Wfd Scheme)

Next, the WFD scheme will be described. In the specification of WFD, three states are defined as the states of the WFD apparatus: Group Owner state (called "G/O state" below), client state (called "CL state" below) and device state. The WFD apparatus is selectively operable in one of the three states described above.

The G/O state WFD apparatus (i.e., G/O apparatus) is an apparatus forming a wireless network (i.e., WFDNW) in which the WFD apparatus operates as a parent station. The CL state WFD apparatus (i.e., CL apparatus) is an apparatus operating as a child station of the WFDNW. The device state WFD apparatus (i.e., device apparatus) is an apparatus not belonging to the WFDNW.

The WFDNW to which both the G/O apparatus and the CL apparatus belong is formed, for example, by either of the two procedures below. In the first procedure, a pair of device apparatuses performs a wireless communication called a G/O negotiation. Thereby, it is determined that one of the pair of device apparatuses will assume the G/O state (i.e., G/O apparatus), and that the other will assume the CL state (i.e., CL apparatus). Then the G/O apparatus forms the WFDNW and establishes a connection with the CL apparatus. Thereby, the WFDNW is formed to which both the G/O apparatus and the CL apparatus belong. In the second procedure, the device apparatus transits automatically to the G/O state without performing G/O negotiation, forming the WFDNW. In this case, after the WFDNW has been formed, the other device apparatus transits to the CL state without performing G/O negotiation, establishing a connection with the G/O apparatus. Thereby, the WFDNW is formed to which both the G/O apparatus and the CL apparatus belong.

The G/O apparatus is capable of performing a wireless communication of target data with the CL apparatus not via another apparatus. The target data is data that includes network layer information of the OSI reference model, and information of a layer higher than the network layer (e.g., application layer), e.g., including image data representing an image of a print target. Further, the G/O apparatus is capable of relaying a wireless communication of target data between a pair of CL apparatuses. Thus, in the WFDNW, each apparatus can perform a wireless communication of the target data not via an access point (called "AP" below) configured as a separate body from each apparatus. That is, the WFD scheme can be said to be a wireless communication scheme in which an AP is not used.

Further, the G/O apparatus cannot perform a wireless communication of the target data with a device apparatus which is not belonging to the WFDNW, but can perform a wireless communication of connection data with a device apparatus, and establish a connection with the device apparatus. Thereby, the G/O apparatus can cause the device apparatus to participate in the WFDNW.

The connection data is data including information of a layer lower than the network layer of the OSI reference model (e.g., physical layer, data link layer) (i.e., data not including network layer information). The connection data includes, e.g. a Probe Request/Response signal, Provision Discovery Request/Response signal, Authentication Request/Response signal, Association Request/Response signal, WSC Exchange, 4-Way Handshake, etc. Moreover, below, Request and Response are abbreviated to "Req.", "Res.", respectively.

The Probe Req. signal is a signal for searching for an apparatus (e.g., G/O apparatus, AP) operating as a parent station of a wireless network, and the Probe Res. signal is a response signal thereto. The Provision Discovery Req. signal is a signal for confirming the method of the WPS (abbreviation of Wi-Fi Protected Setup) (e.g., push button method, PIN code method, etc.), and the Provision Discovery Res. signal is a response signal thereto. The Authentication Req. signal is a signal for confirming an authentication method, and the Authentication Res. signal is a response signal thereto. The Association Req. signal is a signal for requesting a connection, and the Association Res. signal is a response signal thereto. The WSC Exchange is a signal for supplying various kinds of information such as password, etc. The 4-Way Handshake is a signal for performing authentication.

Figure 2:
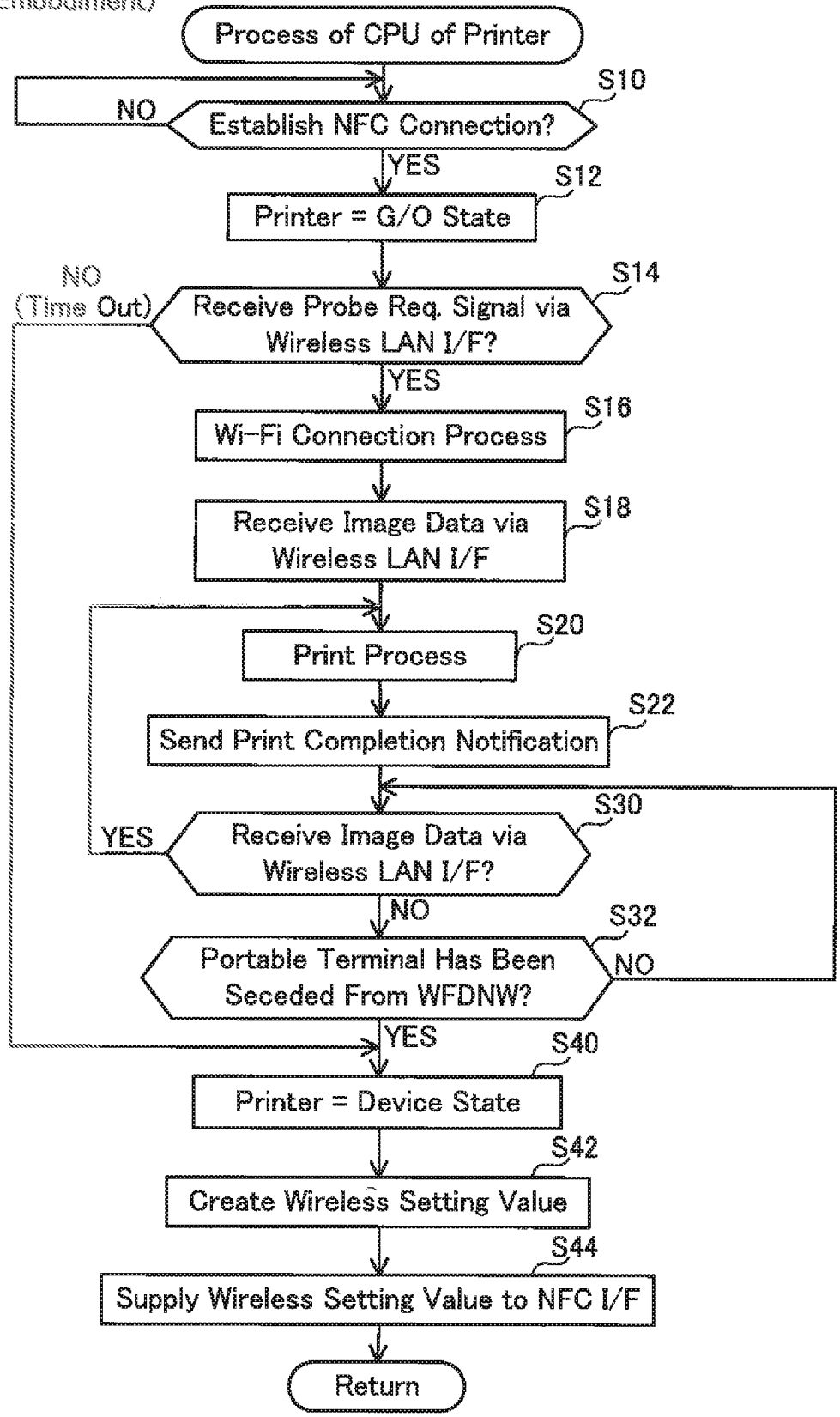
FIG. 2 illustrates a flowchart of a process of a CPU of a printer of a first embodiment.

(Process Performed by CPU 32 of Printer 10; FIG. 2)

Next, the process performed by the CPU 32 of the printer 10 will be described with reference to FIG. 2. When power of the printer 10 is turned ON, the printer 10 is in the device state of the WFD standard without being connected to any wireless network. When the power of the printer 10 is turned ON, the CPU 32 stores a value indicating the device state in the memory 34 as the value indicating the state of the printer 10 (called "WFD state value" below).

Further, when the power of the printer 10 is turned ON, the CPU 32 creates a wireless setting value to be used in the WFDNW. The wireless setting value includes SSID (abbreviation of Service Set Identifier), BSSID (abbreviation of Basic Service Set Identifier), authentication method, encryption method, and password. The SSID and BSSID are identification information for identifying the WFDNW. More specifically, the SSID is a network identifier of the WFDNW, and the BSSID is a MAC address of the printer 10. The authentication method, encryption method, and password are information for performing apparatus authentication, data encryption, etc. in the WFDNW.

The CPU 32 creates the SSID and password by randomly creating character strings. However, the BSSID, authentication method, and encryption method are predetermined information, and not information created by the CPU 32. The CPU 32 stores the created wireless setting value in the memory 34, and further supplies the created wireless setting value to the NFC I/F 22. Thereby, the wireless setting value is stored in the RAM in the NFC I/F 22.

In S10, the CPU 32 monitors whether a connection according to the NFC scheme (called "NFC connection" below) has been established between the NFC I/F 22 of the printer 10 and the NFC I/F 62 of the portable terminal 50. The NFC I/F 22 of the printer 10 periodically sends a request signal to the exterior for establishing an NFC connection. Similarly, the NFC I/F 62 of the portable terminal 50 also periodically sends a request signal to the exterior. If the distance between the pair of NFC I/Fs 22, 62 is equal to or less than a maximum distance allowing NFC communication (e.g., 10 cm), one of the NFC I/Fs receives a request signal from the other I/F, and sends a response signal to the other I/F. Thereby, an NFC connection between the pair of NFC I/Fs 22, 62 is established. The NFC I/F 22 of the printer 10 supplies information to the controller 30 indicating that the NFC connection has been established. As a result, the CPU 32 determines YES in S10, and proceeds to S12.

As described above, the wireless setting value is stored in advance in the RAM of the NFC I/F 22 of the printer 10. When the aforementioned NFC connection is established, the NFC I/F 62 of the portable terminal 50 reads the wireless setting value from the NFC I/F 22 of the printer 10. That is, the CPU 72 of the portable terminal 50 receives the wireless setting value from the printer 10 via the NFC I/F 62. In other words, the CPU 32 of the printer 10 sends the wireless setting value to the portable terminal 50 via the NFC I/F 22 by storing, in advance, the wireless setting value in the RAM of the NFC I/F 22. Moreover, below, the wireless setting value sent to the portable terminal 50 from the printer 10, and the SSID in that wireless setting value are called "target wireless setting value" and "target SSID", respectively.

In S12, the CPU 32 causes the state of the printer 10 to transit to the G/O state spontaneously without performing G/O negotiation. Specifically, the CPU 32 changes the WFD state value in the memory 34 from a value indicating the device state to a value indicating the G/O state. In the step of S12, the CPU 32 forms a WFDNW to which only the printer 10, which is a G/O apparatus, belongs.

In S14, the CPU 32 monitors whether a Probe Req. signal including the target SSID has been received from the portable terminal 50 via the wireless LAN I/F 20. In case a Probe Req. signal including the target SSID has been received, the CPU 32 determines YES in S14, and proceeds to S16. On the other hand, in case a Probe Req. signal including the target SSID has not been received even after a predetermined time has passed since finishing S12, the CPU 32 determines NO in S14, skips S16 to S32, and proceeds to S40.

In S16, the CPU 32 establishes a Wi-Fi connection with the portable terminal 50 via the wireless LAN I/F 20. Specifically, the CPU 32 performs sending of the Probe Res. signal, receiving of the Authentication Req. signal, sending of the Authentication Res. signal, etc. In the course of these communications, the CPU 32 performs authentication and encryption in accordance with the authentication method, encryption method, and password in the target wireless setting value. That is, the CPU 32 establishes a Wi-Fi connection with the portable terminal 50 using the target wireless setting value. As a result, a Wi-Fi connection is established between the wireless LAN I/F 20 of the printer 10 and the wireless LAN I/F 60 of the portable terminal 50. That is, the printer 10 causes the portable terminal 50 to participate as a CL apparatus in the WFDNW in which the printer 10 is a G/O apparatus. Thereby, a WFDNW is formed to which both the printer 10 and the portable terminal 50 belong.

Moreover, in the state of the portable terminal 50 participating in the WFDNW, the CPU 32 periodically sends an existence confirmation signal to the portable terminal 50 via the wireless LAN I/F 20. By monitoring whether a response signal to the existence confirmation signal is received, the CPU 32 can monitor whether the portable terminal 50 secedes from the WFDNW.

In S18, the CPU 32 receives image data from the portable terminal 50 via the wireless LAN I/F 20 using the Wi-Fi connection (i.e., using the WFDNW). Image data has a comparatively large data size. Therefore, the communication speed of NFC communication is slower than the communication speed of WFD communication. Consequently, if a configuration is adopted in which a wireless communication of image data between the printer 10 and the portable terminal 50 is performed using an NFC communication, a long time for the wireless communication of the image data is required. In contrast, in the present embodiment, the printer 10 and the portable terminal 50 perform a wireless communication of the image data using a Wi-Fi communication, and consequently the wireless communication of the image data can be performed rapidly.

Next, in S20, the CPU 32 supplies the image data to the print performing unit 16. Thereby, the print performing unit 16 prints an image represented by the image data on a print medium. When the print of the image is completed, the CPU 32 proceeds to S22.

In S22, the CPU 32 sends print completion notification to the portable terminal 50 via the wireless LAN I/F 20 using the Wi-Fi connection. The print completion notification is a command for notifying that printing has been completed.

Next, the CPU 32 repeatedly executes the monitoring process of S30 and the monitoring process of S32 until YES is determined in S30 or S32. In S30, the CPU 32 monitors whether image data (e.g., image data different from the image data of S18) has been received from the portable terminal 50 via the wireless LAN I/F 20. In case image data has been received from the portable terminal 50, the CPU 32 determines YES in S30, and again executes S20 and S22.

Further, in S32 the CPU 32 monitors whether the portable terminal 50 has seceded from the WFDNW. As described above, the CPU 32 periodically sends an existence confirmation signal to the portable terminal 50 via the wireless LAN I/F 20. Then, in case of not receiving a response signal to the existence confirmation signal from the portable terminal 50, the CPU 32 determines that the portable terminal 50 has seceded from the WFDNW (YES in S32), and proceeds to S40.

In S40, the CPU 32 changes the state of the printer 10 from the G/O state to the device state. That is, the CPU 32 changes the WFD state value in the memory 34 from the value indicating the G/O state to a value indicating the device state. Thereby, the WFDNW disappears.

Next, in S42, the CPU 32 creates a new wireless setting value, and stores the new wireless setting value in the memory 34 in place of the old wireless setting value. In S42, also, the CPU 32 creates an SSID and password by randomly creating character strings. Consequently, the SSID and password created in S42 are usually different from the SSID and password created when the power is turned ON (or when S42 was performed in the past).

Next, in S44, the CPU 32 supplies the new wireless setting value to the NFC I/F 22. As a result, the new wireless setting value is stored in place of the old wireless setting value in the RAM of the NFC I/F 22. When S44 ends, the process returns to S10.

Figure 3:
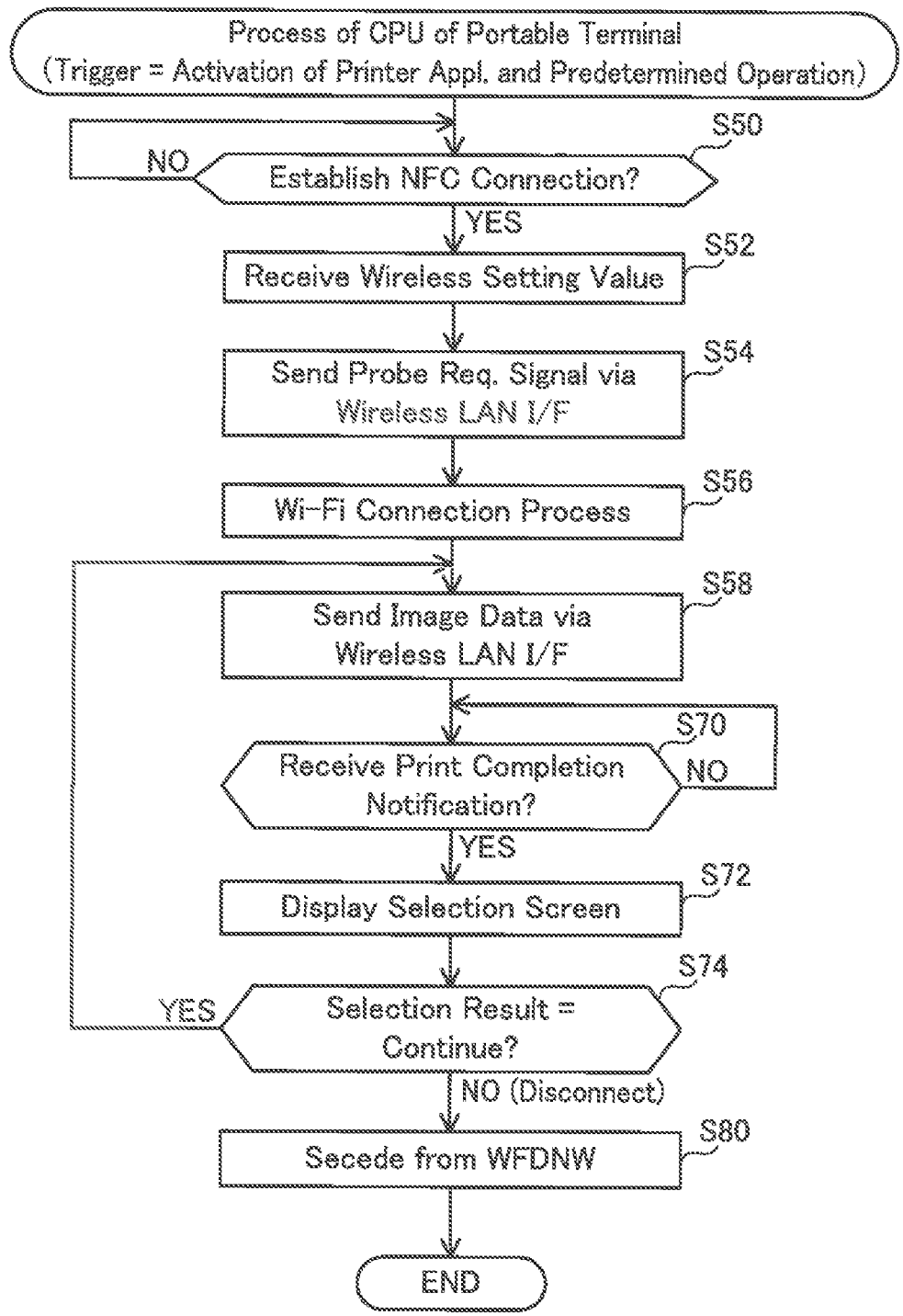
FIG. 3 illustrates a flowchart of a process of a CPU of a portable terminal of the first embodiment.

(Process Performed by CPU 72 of Portable Terminal 50; FIG. 3)

Next, a process performed by the CPU 72 of the portable terminal 50 will be described with reference to FIG. 3. In case an operation for activating the printer appl. and a predetermined operation are performed on the operating unit 52, the CPU 72 starts the process of FIG. 3. The predetermined operation includes selecting image data in the memory 74 of the portable terminal 50 (i.e., image data representing an image of a print target).

In S50, the CPU 72 monitors whether an NFC connection has been established (see S10 of FIG. 2). The NFC I/F 62 of the portable terminal 50 supplies information indicating that an NFC connection has been established to the controller 70. As a result, the CPU 72 determines YES in S50 and, in S52, receives a target wireless setting value from the printer 10 via the NFC I/F 62. The CPU 72 stores the target wireless setting value in the memory 74.

Next, in S54, the CPU 72 sends a Probe Req. signal including the target SSID to the printer 10 via the wireless LAN I/F 60 (see S14 of FIG. 2). Next, in S56, the CPU 72 establishes a Wi-Fi connection with the printer 10 via the wireless LAN I/F 60 (see S16 of FIG. 2). Specifically, the CPU 72 performs receiving of the Probe Res. signal, sending of the Authentication Req. signal, receiving of the Authentication Res. signal, etc. The CPU 72 performs authentication and encryption in accordance with the authentication method, encryption method, and password in the target wireless setting value. That is, the CPU 72 establishes a Wi-Fi connection with the printer 10 using the target wireless setting value. Thereby, the portable terminal 50 participates in the WFDNW as a CL apparatus.

In S58, the CPU 72 sends image data to the printer 10 via the wireless LAN I/F 60 using the Wi-Fi connection (see S18 of FIG. 2). The image data is image data selected in the predetermined operation described above.

Next, in S70, the CPU 72 monitors whether a print completion notification has been received from the printer 10 via the wireless LAN I/F 60 using the Wi-Fi connection (see S22 of FIG. 2). In case of receiving the print completion notification, the CPU 72 determines YES in S70, and proceeds to S72.

In S72, the CPU 72 causes the display unit 54 to display a selection screen. The selection screen includes a button indicating "Continue", and a button indicating "Disconnect" (see T60 of FIG. 3). The user selects the button indicating "Continue" in case of desiring to perform additional printing in accordance with image data different from the image data already sent, and selects the button indicating "Disconnect" in case of not desiring to perform additional printing.

Next, in S74, the CPU 72 determines whether the button indicating "Continue" or the button indicating "Disconnect" has been selected. In case of determining that the button indicating "Continue" has been selected (YES in S74), the CPU 72 performs S58, S70, S72, S74 again. Moreover, in case of selecting the button indicating "Continue", the user further newly selects image data from within the memory 74. Then, in S58 which is performed again, the CPU 72 sends the newly selected image data to the printer 10. On the other hand, in case of determining that the button indicating "Disconnect" has been selected (NO in S74), the CPU 72 proceeds to S80.

In S80, the CPU 72 causes the portable terminal 50 to secede from the WFDNW (see YES in S32 of FIG. 2). In a state where the portable terminal 50 is participating in the WFDNW, the CPU 72 sends a response signal to the printer 10 in case of receiving an existence confirmation signal from the printer 10. In S80, the CPU 72 transits from a state of sending a response signal to a state of not sending a response signal, thereby seceding from the WFDNW. Further, the CPU 72 deletes the target wireless setting value from the memory 74. When S80 is performed, the Wi-Fi connection between the wireless LAN I/F 20 of the printer 10 and the wireless LAN I/F 60 of the portable terminal 50 is disconnected. That is, in S80, the CPU 72 causes the portable terminal 50 to secede from the WFDNW, disconnecting the Wi-Fi connection. When S80 ends, the process of FIG. 3 ends.

Moreover, in S80 described above, the CPU 72 causes the portable terminal 50 to secede from the WFDNW without sending, to the printer 10, a disconnect signal for disconnecting the Wi-Fi connection. Instead, in a modification, the CPU 72 may, e.g., cause the portable terminal 50 to secede from the WFDNW by sending a disconnect signal for disconnecting the Wi-Fi connection to the printer 10, thus disconnecting the Wi-Fi connection.

Figure 4:
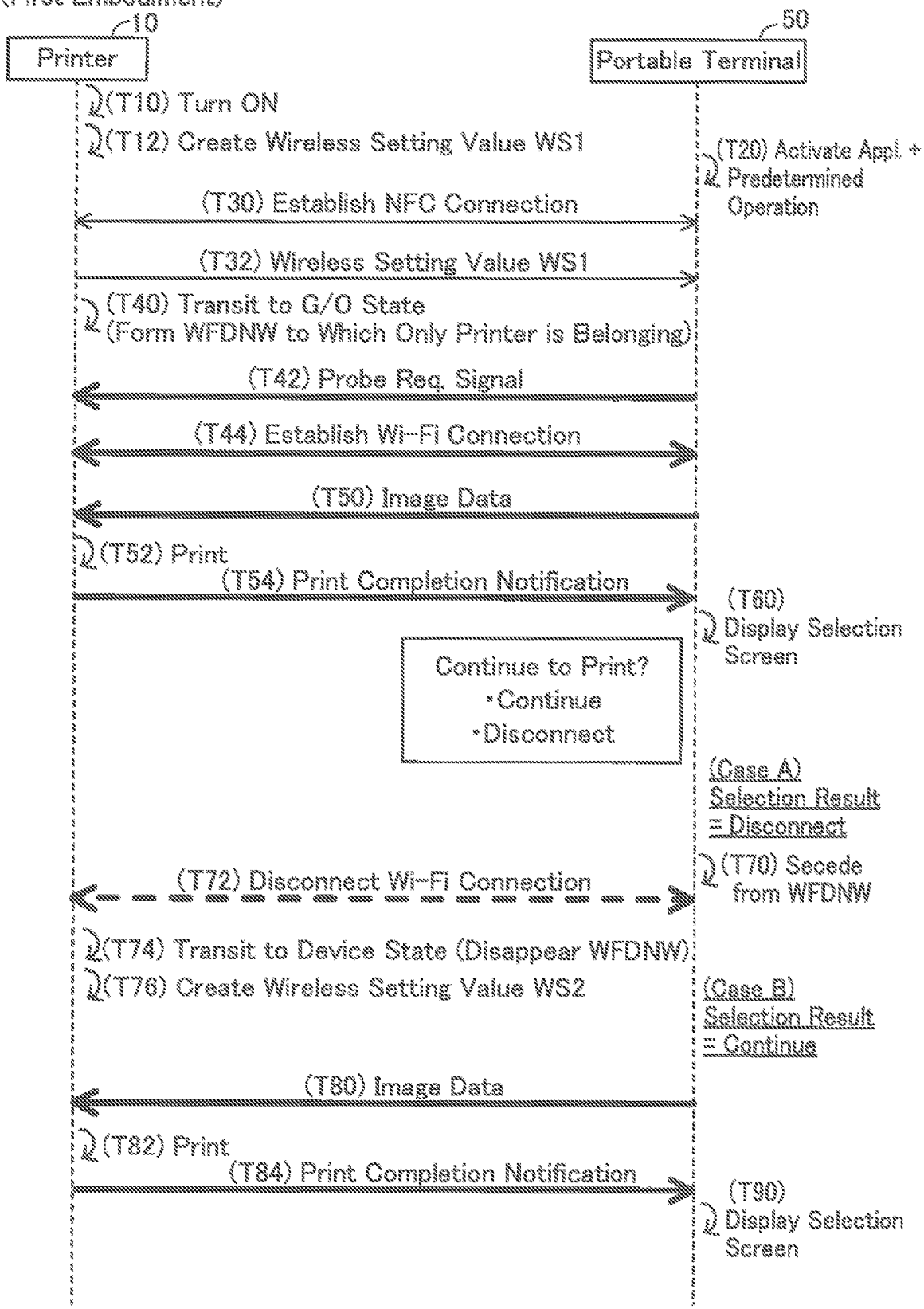
FIG. 4 illustrates a sequence diagram of the first embodiment.

(Specific Example; FIG. 4)

A specific example of the present embodiment will be described with reference to FIG. 4. The processes of FIG. 4 are realized by the flowcharts of FIG. 2 and FIG. 3. Moreover, in FIG. 4, the thin arrow indicates NFC communication, and the thick arrow indicates Wi-Fi communication. Further, the broken line arrow does not indicate the communication of any data, but indicates that the Wi-Fi connection has been disconnected.

In T10, the power is turned ON in the printer 10. In T12, the printer 10 creates a wireless setting value WS1 (the process when power is ON of FIG. 2).

In T20, the print appl. is activated in the portable terminal 50, and the predetermined operation is performed (the trigger of the process of FIG. 3). Then, the user of the portable terminal 50 brings the portable terminal 50 closer to the printer 10. Thereby, in T30, an NFC connection is established between the printer 10 and the portable terminal 50 (YES in S10 of FIG. 2, YES in S50 of FIG. 3). Then, in T32, the wireless setting value WS1 is sent from the printer 10 to the portable terminal 50 (S52 of FIG. 3).

In T40, the printer 10 transits from the device state to the G/O state, forming a WFDNW to which only the printer 10 is belonging (S12 of FIG. 2). In T42, a Probe Req. signal is sent from the portable terminal 50 to the printer 10 (YES in S14 of FIG. 2, S54 of FIG. 3). In T44, a Wi-Fi connection is established between the printer 10 and the portable terminal 50 (S16 of FIG. 2, S56 of FIG. 3).

In T50, image data is sent from the portable terminal 50 to the printer 10 (S18 of FIG. 2, S58 of FIG. 3). In T52, the printer 10 performs printing of the image (S20 of FIG. 2). In T54, a print completion notification is sent from the printer 10 to the portable terminal 50 (S22 of FIG. 2, YES in S70 of FIG. 3).

In T60, the portable terminal 50 displays a selection screen (S72 of FIG. 3). Then, the portable terminal 50 determines whether a disconnection condition is satisfied depending on the selection result in the selection screen (S74 of FIG. 3). In the case where the button indicating "Disconnect" has been selected (NO in S74 of FIG. 3), the portable terminal 50 determines that the disconnection condition is satisfied, and proceeds to case A. On the other hand, in the case where the button indicating "Continue" has been selected (YES in S74 of FIG. 3), the portable terminal 50 determines that the disconnection condition is not satisfied, and proceeds to case B.

In case A, in T70, the portable terminal 50 secedes from the WFDNW (YES in S32 of FIG. 2, S80 of FIG. 3). Thereby, in T72, the Wi-Fi connection between the printer 10 and the portable terminal 50 is disconnected. In T74, the printer 10 transits from the G/O state to the device state (S40 of FIG. 2). Then, in T76, the printer 10 newly creates a wireless setting value WS2 (S42, S44 of FIG. 2).

In case B, in T80, image data is sent from the portable terminal 50 to the printer 10 (YES in S30 of FIG. 2, S58 of FIG. 3). In T82, the printer 10 performs printing of the image (S20 of FIG. 2). In T84, print completion notification is sent from the printer 10 to the portable terminal 50 (S22 of FIG. 2, YES in S70 of FIG. 3). Then, in T90, the portable terminal 50 displays the selection screen (S72 of FIG. 3). The portable terminal 50 again determines whether the disconnection condition is satisfied depending on the selection result in the selection screen (S74 of FIG. 3). Then, depending on the determination result, case A or case B described above is performed again.

Effect of First Embodiment

According to the present embodiment, the portable terminal 50 receives the wireless setting value WS1 from the printer 10 via the NFC I/F 62 (T32 of FIG. 4), and then a Wi-Fi connection with the printer 10 is established via the wireless LAN I/F 60 using the wireless setting value WS1 (T42, T44). Then, the portable terminal 50 sends the image data to the printer 10 via the wireless LAN I/F 60 using the Wi-Fi connection (T50). After having sent the image data in T50, the portable terminal 50 displays the selection screen (T60). Then, depending on the selection result of the user, the portable terminal 50 determines whether the disconnection condition is satisfied. That is, in case the selection result is "Disconnect", the portable terminal 50 determines that the disconnection condition is satisfied, and disconnects the Wi-Fi connection (T70, T72). Thereby, the portable terminal 50 does not need to send a response signal to the existence confirmation signal. That is, it is possible to reduce the processing load of the portable terminal 50. On the other hand, in case the selection result is "Continue", the portable terminal 50 determines that the disconnection condition is not satisfied, maintains the Wi-Fi connection, and sends the image data to the printer 10 via the wireless LAN I/F 60 using the Wi-Fi connection (T80).

As described above, according to the present embodiment, after changing the I/F for wireless communication from the NFC I/F 62 to the wireless LAN I/F 60 and sending the image data in T50, the portable terminal 50 can perform appropriate processes depending on whether or not the disconnection condition is satisfied (i.e., depending on the intention of the user).

(Correspondence Relationship)

The portable terminal 50 is an example of "communication apparatus". The NFC I/F 62 and the wireless LAN I/F 60 are examples of "communication apparatus", "first wireless communication interface", and "second wireless communication interface", respectively. The Wi-Fi connection is an example of "wireless connection". The image data of T50, and the image data of T80 of FIG. 4 are examples of "first image data" and "second image data", respectively. The print completion notification is an example of "predetermined notification". Selection of "Disconnect" in the selection screen of T60 is an example of "apparatus-side disconnection condition is satisfied".

Second Embodiment

Points different from the first embodiment will be described. In the present embodiment, the memory 34 of the printer 10 stores a user ID list in which one or more user IDs are written. The user ID is identification information for identifying the user of the portable terminal 50, and is set in the printer appl. by the user at the time the printer appl. is installed in the portable terminal 50. In other words, the user ID can also be said to be identification information for identifying the portable terminal 50.

By operating the operating unit 12 of the printer 10, an administrator of the printer 10 can register, in the printer 10, the user ID set in the portable terminal 50 (i.e., the user ID list). For example, if the user of the portable terminal 50 is a user who frequently uses the printer 10 (called "permanent user" below), the administrator registers the user ID in the printer 10. Further, e.g., if the user of the portable terminal 50 is a user who temporarily uses the printer 10 (called "temporary user" below), the administrator does not register the user ID in the printer 10. Thereby, as described in detail later, in case the permanent user causes the printer 10 to perform a print, the printer 10 does not proactively disconnect the Wi-Fi connection after the completion of printing (i.e., S22A of FIG. 5 described below is performed due to YES in S21). As a result, the permanent user can cause the printer 10 to perform a print a plurality of times using the Wi-Fi connection. On the other hand, in case the temporary user causes the printer 10 to perform a print, the printer 10 proactively disconnects the Wi-Fi connection after the completion of printing (i.e., S40 described below is performed due to NO in S21). As a result, it is possible to reduce the processing load of the printer 10.

Figure 5:
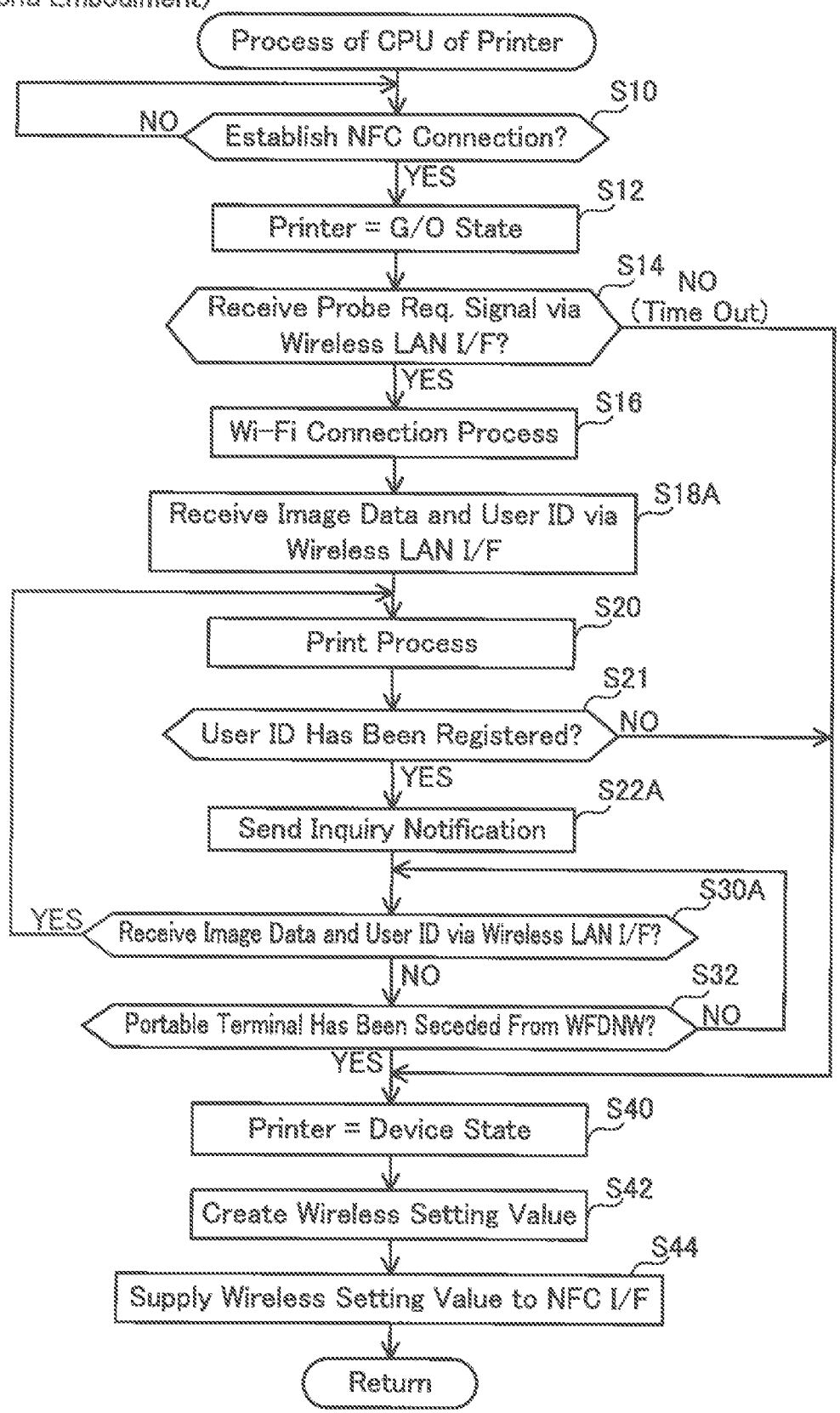
FIG. 5 illustrates a flowchart of a process of a CPU of a printer of a second embodiment.

(Process Performed by CPU 32 of Printer 10; FIG. 5)

The CPU 32 of the printer 10 performs the process of FIG. 5 instead of the process of FIG. 2. In FIG. 5, the process of turning ON the power and the process of S10 to S16 are the same as FIG. 2. S18A is approximately the same as S18 of FIG. 2. However, in S18A, the CPU 32 receives not only the image data but also the user ID set in the printer appl. of the portable terminal 50. S20 is the same as S20 of FIG. 2.

Next, in S21, the CPU 32 determines whether the user ID received in S18A has been registered in the user ID list in the memory 34. In case of determining that the user ID has been registered in the user ID list (YES in S21), in S22A the CPU 32 sends an inquiry notification to the portable terminal 50 via the wireless LAN I/F 20 using the Wi-Fi connection, and proceeds to S30A. The inquiry notification is a notification for causing the portable terminal 50 to display a selection screen and enquiring "Continue" and "Disconnect" to the user. S30A is approximately the same as S30 of FIG. 2. However, in case of YES in S30A, the CPU 32 receives not only the image data, but also the user ID. S32 is the same as S32 of FIG. 2.

Further, in case of determining that the user ID has not been registered in the user ID list (NO in S21), the CPU 32 skips S22A to S32 and proceeds to S40. S40 to S44 are the same as S40 to S44 of FIG. 2. Moreover, in case of performing S40 due to NO in S21, in a state where the portable terminal 50 is participating in the WFDNW, the CPU 32 of the printer 10 causes the WFDNW to disappear. That is, the printer 10 disconnects the Wi-Fi connection. In this case, due to no longer receiving an existence confirmation signal from the printer 10, the portable terminal 50 can learn that the WFDNW has disappeared, i.e., that the Wi-Fi connection has been disconnected. On the other hand, in case of performing S40 due to YES in S32, the portable terminal 50 is already disengaged from the WFDNW. That is, the portable terminal 50 results in disconnecting the Wi-Fi connection. Thus, in the present embodiment, it is possible for the printer 10 to proactively disconnect the Wi-Fi connection (the case of NO in S21), and it is possible for the portable terminal 50 to proactively disconnect the Wi-Fi connection (the case of YES in S21, YES in S32).

Figure 6:
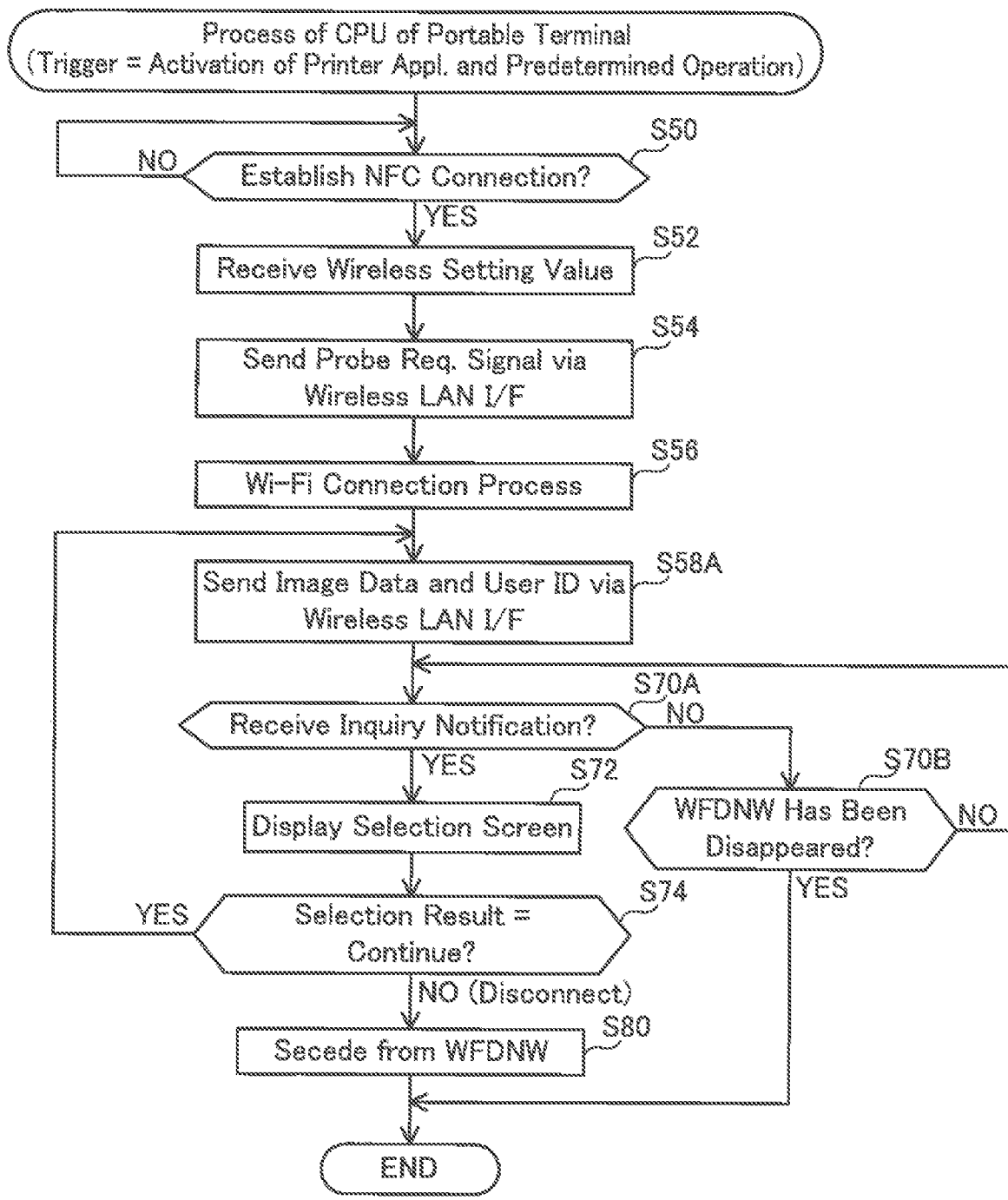
FIG. 6 illustrates a flowchart of a process of a CPU of a portable terminal of the second embodiment.

(Process Performed by CPU 72 of Portable Terminal 50; FIG. 6)

The CPU 72 of the portable terminal 50 performs the process of FIG. 6 instead of the process of FIG. 3. S50 to S56 are the same as S50 to S56 of FIG. 3. S58A is approximately the same as S58 of FIG. 3. However, in S58A, the CPU 72 sends not only the image data, but also the user ID set in the printer appl. of the portable terminal 50 (see S18A of FIG. 5).

In S70A, the CPU 72 monitors whether an inquiry notification has been received from the printer 10 via the wireless LAN I/F 60 using the Wi-Fi connection (see S22A of FIG. 5). In case of receiving an inquiry notification from the printer 10, the CPU 72 determines YES in S70A, and proceeds to S72. S72 to S80 are the same as S72 to S80 of FIG. 3. On the other hand, in case an inquiry notification has not been received from the printer 10 even after a predetermined time has passed since finishing S58A (see NO in S21 of FIG. 5), the CPU 72 determines NO in S70A, and proceeds to S70B. In S70B, the CPU 72 monitors whether the WFDNW has disappeared and, if the WFDNW has not disappeared (NO in S70B), i.e., in case of receiving an existence confirmation signal from the printer 10, returns to S70A. On the other hand, if the WFDNW has disappeared (YES in S70B), i.e., if an existence confirmation signal has not been received from the printer 10 for a predetermined period, the CPU 72 skips S72 to S80, and ends the process of FIG. 6.

Figure 7:
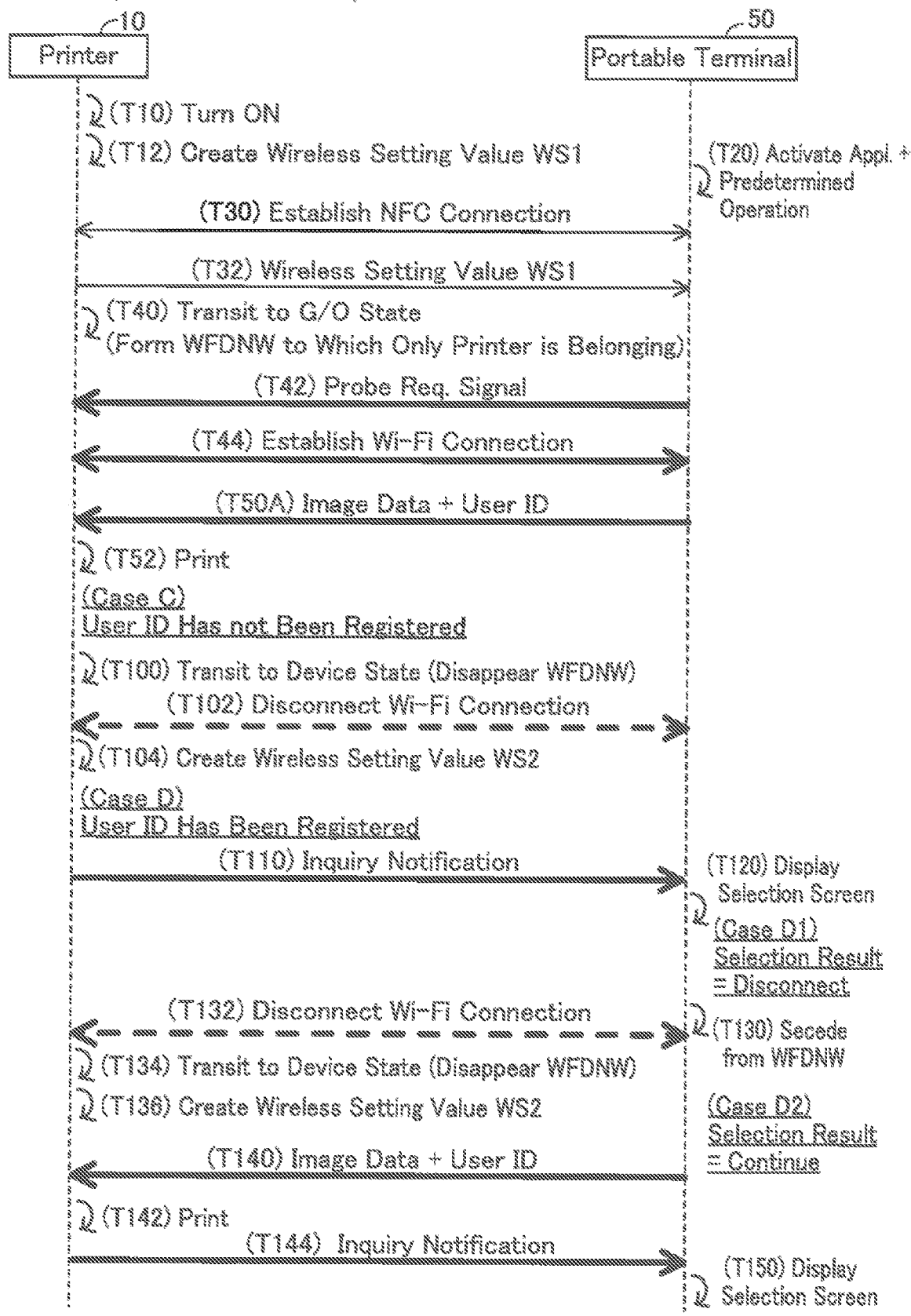
FIG. 7 illustrates a sequence diagram of the second embodiment.

Specific Example; FIG. 7

Next, a specific example of the present embodiment will be described with reference to FIG. 7. The processes of FIG. 7 are realized by the flowcharts of FIG. 5 and FIG. 6. T10 to T52 are approximately the same as T10 to T52 of FIG. 4. However, in T50A, the image data and the user ID are sent from the portable terminal 50 to the printer 10 (S18A of FIG. 5, S58A of FIG. 6).

When the print of T52 is completed, the printer 10 determines whether the disconnection condition is satisfied depending on whether or not the user ID of T50A has been registered in the user ID list (S21 of FIG. 5). In case the user ID has not been registered in the user ID list (NO in S21 of FIG. 5), the printer 10 determines that the disconnection condition is satisfied, and proceeds to case C. On the other hand, in case the user ID has been registered in the user ID list (YES in S21 of FIG. 5), the printer 10 determines that the disconnection condition is not satisfied, and proceeds to case D.

In case C, in T100, the printer 10 causes the WFDNW to disappear (S40 of FIG. 5). Thereby, in T102, the Wi-Fi connection between the printer 10 and the portable terminal 50 is disconnected. That is, the printer 10 proactively disconnects the Wi-Fi connection. Then, in T104, the printer 10 newly creates the wireless setting value WS2 (S42, S44 of FIG. 5).

In case D, in T110, an inquiry notification is sent from the printer 10 to the portable terminal 50 (S22A of FIG. 5, YES in S70A of FIG. 6). Thereby, in T120, the portable terminal 50 displays the selection screen (S72 of FIG. 6). Then, depending on the selection result in the selection screen, the portable terminal 50 determines whether the disconnection condition is satisfied (S74 of FIG. 6). In case the button indicating "Disconnect" is selected (NO in S74 of FIG. 6), the portable terminal 50 determines that the disconnection condition is satisfied, and proceeds to case D1. On the other hand, in case the button indicating "Continue" is selected (YES in S74 of FIG. 6), the portable terminal 50 determines that the disconnection condition is not satisfied, and proceeds to case D2.

T130 to T136 of case D1 are the same as T70 to T76 of case A of FIG. 4. That is, in case D1, the portable terminal 50 proactively disconnects the Wi-Fi connection.

T140 to T150 of case D2 are approximately the same as T80 to T90 of case B of FIG. 4. However, in T140, the image data and the user ID are sent from the portable terminal 50 to the printer 10 (YES in S30A of FIG. 5, S58A of FIG. 6). When the print of T142 is completed, the printer 10 again determines whether or not the disconnection condition is satisfied depending on whether or not the user ID of T140 has been registered in the user ID list (S21 of FIG. 5). Further, in T144, an inquiry notification is sent from the printer 10 to the portable terminal 50 (S22A of FIG. 5, YES in S70A of FIG. 6). The portable terminal 50 again determines whether or not the disconnection condition is satisfied depending on the selection result in the selection screen of T150. Then, according to the determination result, case D1 or case D2 is performed again.

Effect of Second Embodiment

As with the first embodiment, after changing the I/F for wireless communication from the NFC I/F 62 to the wireless LAN I/F 60 and sending the image data in T50A of FIG. 7, the portable terminal 50 can perform appropriate processes (see case D1 and D2 of FIG. 7) depending on whether or not the disconnection condition is satisfied (i.e., depending on the intention of the user).

Further, in the present embodiment, the printer 10 sends the wireless setting value WS1 to the portable terminal 50 via the NFC I/F 22 (T32 of FIG. 7), and then establishes the Wi-Fi connection with the portable terminal 50 via the wireless LAN I/F 20 using the wireless setting value WS1 (T42, T44). Then, the printer 10 receives image data from the portable terminal 50 via the wireless LAN I/F 20 using the Wi-Fi connection (T50A). After receiving the image data of T50A, the printer 10 determines whether the disconnection condition is satisfied by determining whether the user ID of T50A has been registered in the user ID list. That is, if the user ID has not been registered in the user ID list, the printer 10 determines that the disconnection condition is satisfied and disconnects the Wi-Fi connection (T100, T102). Thereby, the printer 10 does not need to send an existence confirmation signal to the portable terminal 50. That is, it is possible to reduce the processing load of the printer 10. On the other hand, if the user ID has been registered in the user ID list, the printer 10 determines that the disconnection condition is not satisfied, maintains the Wi-Fi connection, and receives image data from the portable terminal 50 via the wireless LAN I/F 20 using the Wi-Fi connection (T140).

As described above, according to the present embodiment, after changing the I/F for wireless communication from the NFC I/F 22 to the wireless LAN I/F 20 and sending the image data of T50A, the printer 10 can perform appropriate processes depending on whether or not the disconnection condition is satisfied (i.e., depending on whether or not the user ID has been registered).

(Correspondence Relationship)

The NFC I/F 22 and the wireless LAN I/F 20 are examples of "first wireless communication interface" and "second wireless communication interface" of "printer", respectively. The image data of T50A and the image data of T140 of FIG. 7 are examples of "first image data" and "second image data", respectively. The inquiry notification is an example of "predetermined notification". The user ID not having been registered in the user ID list is an example of "printer-side disconnection condition is satisfied".

(Modification 1)

In the first and second embodiments, the printer 10 spontaneously transits to the G/O state and forms the WFDNW (S12 of FIG. 2 and FIG. 5), and the portable terminal 50 participates in the WFDNW as a CL apparatus (S54 and S56 of FIG. 3 and FIG. 6). Instead, (Modification 1-1) or (Modification 1-2) below may be adopted.

(Modification 1-1)

In case the printer appl. is activated, the portable terminal 50 spontaneously transits to the G/O state and forms the WFDNW. At this juncture, the portable terminal 50 creates a wireless setting value to be used in the WFDNW. Then, in case an NFC connection is established between the printer 10 and the portable terminal 50, the portable terminal 50 sends the wireless setting value to the printer 10 using the NFC connection. In this configuration, also, the printer 10 and the portable terminal 50 can establish a Wi-Fi connection using the wireless setting value. That is, the printer 10 can participate as a CL apparatus in the WFDNW in which the portable terminal 50 is operating as a G/O apparatus. That is, a communication apparatus may send a wireless setting value to a printer, and establish a wireless connection with the printer in order to cause the printer to participate as a child station in a wireless network in which the communication apparatus is a parent station. Further, a printer may receive a wireless setting value from a communication apparatus, and establish a wireless connection with the communication apparatus in order to cause the printer to participate as a child station in a wireless network in which the communication apparatus is a parent station.

In (Modification 1-1) described above, in case of determining that the disconnection condition is satisfied, the portable terminal 50 may disconnect the Wi-Fi connection by causing the WFDNW to disappear. Further, in case of determining that the disconnection condition is satisfied, the printer 10 may cause the printer 10 to leave the WFDNW, thus disconnecting the Wi-Fi connection. That is, a communication apparatus may disconnect a wireless connection by causing a wireless network to disappear if it is determined an apparatus-side disconnection condition is satisfied. Further, a printer may disconnect a wireless connection by causing the printer to secede from a wireless network if it is determined a printer-side disconnection condition is satisfied.

(Modification 1-2)

The printer 10 and the portable terminal 50 may perform G/O negotiation of the WFD scheme. In this case, as a result of the negotiation, one of the printer 10 and the portable terminal 50 becomes the G/O apparatus, and the other becomes the CL apparatus. For example, in case the printer 10 becomes the G/O apparatus, the wireless setting value is sent from the printer 10 to the portable terminal 50 by means of NFC communication, as in the first and second embodiments. Further, e.g., in case the portable terminal 50 becomes the G/O apparatus, the wireless setting value is sent from the portable terminal 50 to the printer 10 by means of NFC communication, as in (Modification 1-1) above. Generally speaking, the wireless network may be formed by one of the "communication apparatus" and the "printer" spontaneously becoming the parent station, or the wireless network may be formed by the "communication apparatus" and the "printer" performing negotiation.

(Modification 2)

In the first and second embodiments, the portable terminal 50 displays the selection screen (S72 of FIG. 3 and FIG. 6), and determines whether the disconnection condition is satisfied depending on the selection result of the user (S74 of FIG. 3 and FIG. 6). Instead, (Modification 2-1) or (Modification 2-2) below may be adopted.

(Modification 2-1)

Figure 8:
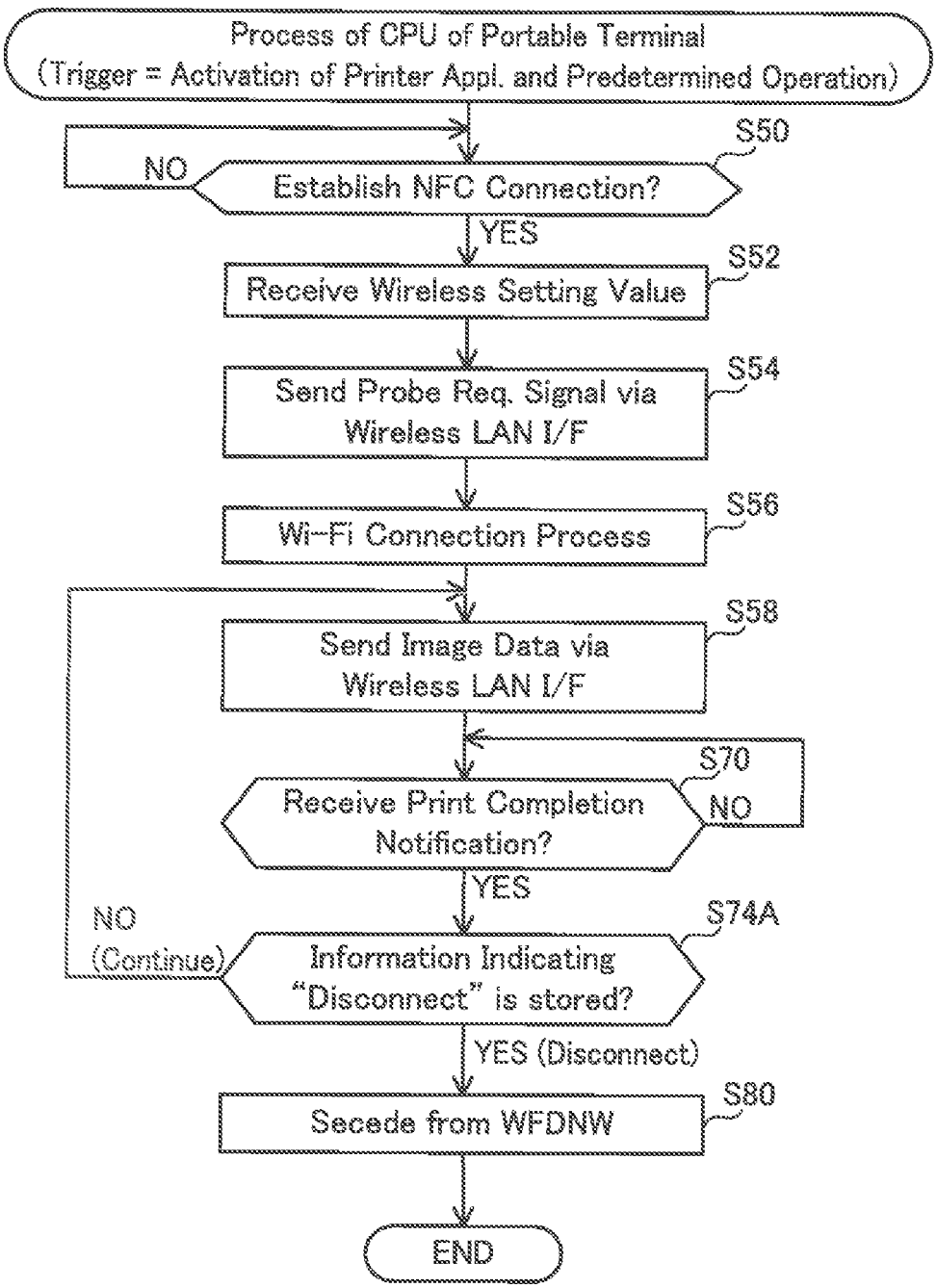
FIG. 8 illustrates a flowchart of a process of a CPU of a portable terminal of a modification.

Information indicating "Continue" or "Disconnect" may be registered in advance by the user in the memory 74 of the portable terminal 50. In this case, as shown in S74A of FIG. 8, the CPU 72 of the portable terminal 50 may determine whether the disconnection condition is satisfied depending on the information in the memory 74 without displaying the selection screen. The CPU 72 determines YES in S74A if the information indicating "Disconnect" is stored in the memory 74, and proceeds to S80. The CPU 72 determines NO in S74A if the information indicating "Continue" is stored in the memory 74, and proceeds to S58. In the present modification, registering information indicating "Disconnect" in the memory 74 is an example of "apparatus-side disconnection condition is satisfied". Further, the information indicating "Disconnect" is an example of "predetermined information".

(Modification 2-2)

Figure 9:
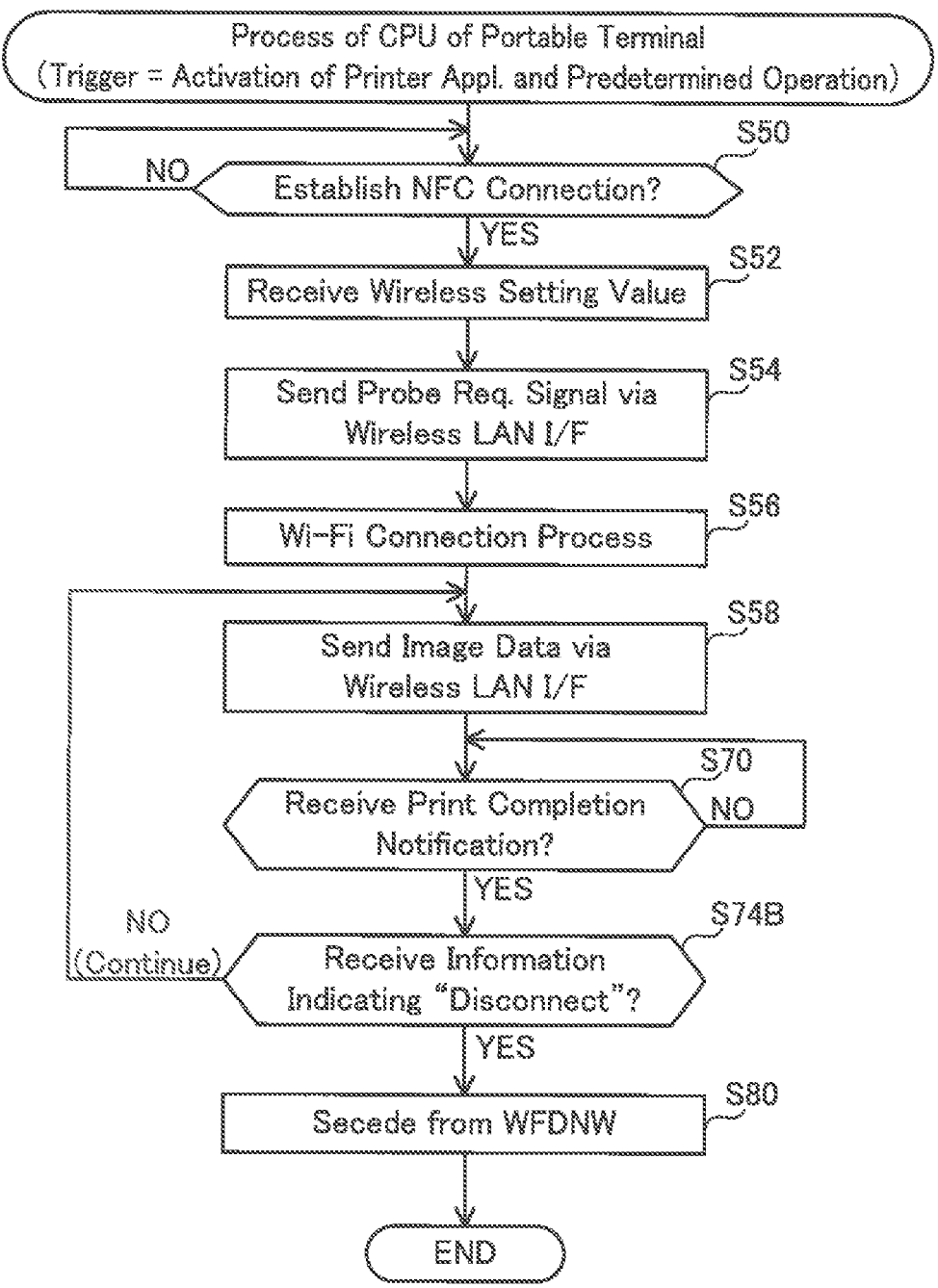
FIG. 9 illustrates a flowchart of a process of a CPU of a portable terminal of a modification.

In the second embodiment, in case of determining that the user ID has been registered (YES in S21 of FIG. 5), the printer 10 may send information indicating "Continue" to the portable terminal 50 without sending an inquiry notification to the portable terminal 50 and, in case of determining that the user ID has not been registered (NO in S21 of FIG. 5), may send information indicating "Disconnect" to the portable terminal 50. In this case, as shown in S74B of FIG. 9, the CPU 72 of the portable terminal 50 may determine whether the disconnection condition is satisfied depending on the information received from the printer 10 without displaying the selection screen. The CPU 72 determines YES in S74B if the information indicating "Disconnect" is received from the printer 10, and proceeds to S80. The CPU 72 determines NO in S74B if the information indicating "Continue" is received from the printer 10, and proceeds to S58. In the present modification, receiving information indicating "Disconnect" from the printer 10 is an example of "apparatus-side disconnection condition is satisfied". Further, the information indicating "Disconnect", the information indicating "Continue" are examples of "first information", "second information" respectively.

As described above, in (Modification 2-1) and (Modification 2-2) above, the selection screen is not displayed. Consequently, the "communication apparatus" need not comprise a "display controller".

(Modification 3)

In the second embodiment, the printer 10 determines whether the disconnection condition is satisfied depending on whether or not the user ID has been registered in the user ID list (S21 of FIG. 5). Instead, (Modification 3-1) or (Modification 3-2) below may be adopted.

(Modification 3-1)

Figure 10:
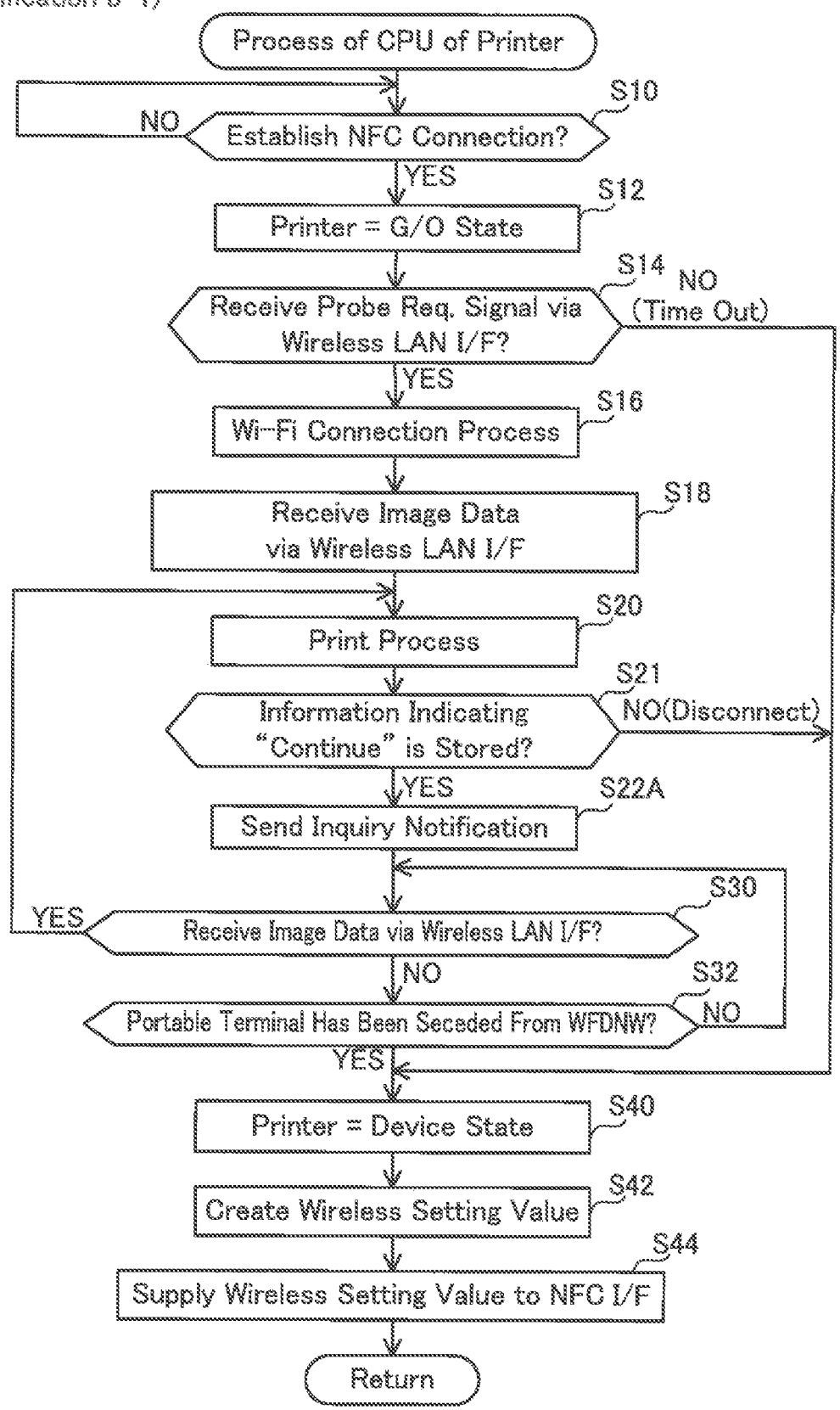
FIG. 10 illustrates a flowchart of a process of a CPU of a printer of a modification.

Instead of the user ID list, information indicating "Continue" or "Disconnect" may be registered in advance by the user in the memory 34 of the printer 10. In this case, as shown in S21 of FIG. 10, the CPU 32 of the printer 10 may determine whether the disconnection condition is satisfied depending on the information in the memory 34. The CPU 32 determines NO in S21 if the information indicating "Disconnect" is stored in the memory 34, and proceeds to S40. The CPU 32 determines YES in S21 if the information indicating "Continue" is stored in the memory 34, and proceeds to S22A. In the present modification, registering the information indicating "Disconnect" in the memory 34 is an example of "printer-side disconnection condition is satisfied". Further, the information indicating "Disconnect" is an example of "predetermined information".

(Modification 3-2)

In S21 of FIG. 5, the printer 10 may determine that the disconnection condition is satisfied in the case where free space in the memory 34 is less than a predetermined value, and may determine that the disconnection condition is not satisfied in the case where the free space in the memory 34 is equal to or more than the predetermined value. According to this configuration, in the case where the free space in the memory 34 is less than the predetermined value, the printer 10 can increase the free space in the memory 34 due to transiting from the G/O state to the device state (i.e., due to disconnecting the Wi-Fi connection). In the present modification, the free space in the memory 34 being less than the predetermined value is an example of "printer-side disconnection condition is satisfied".

(Modification 4)

Figure 11:
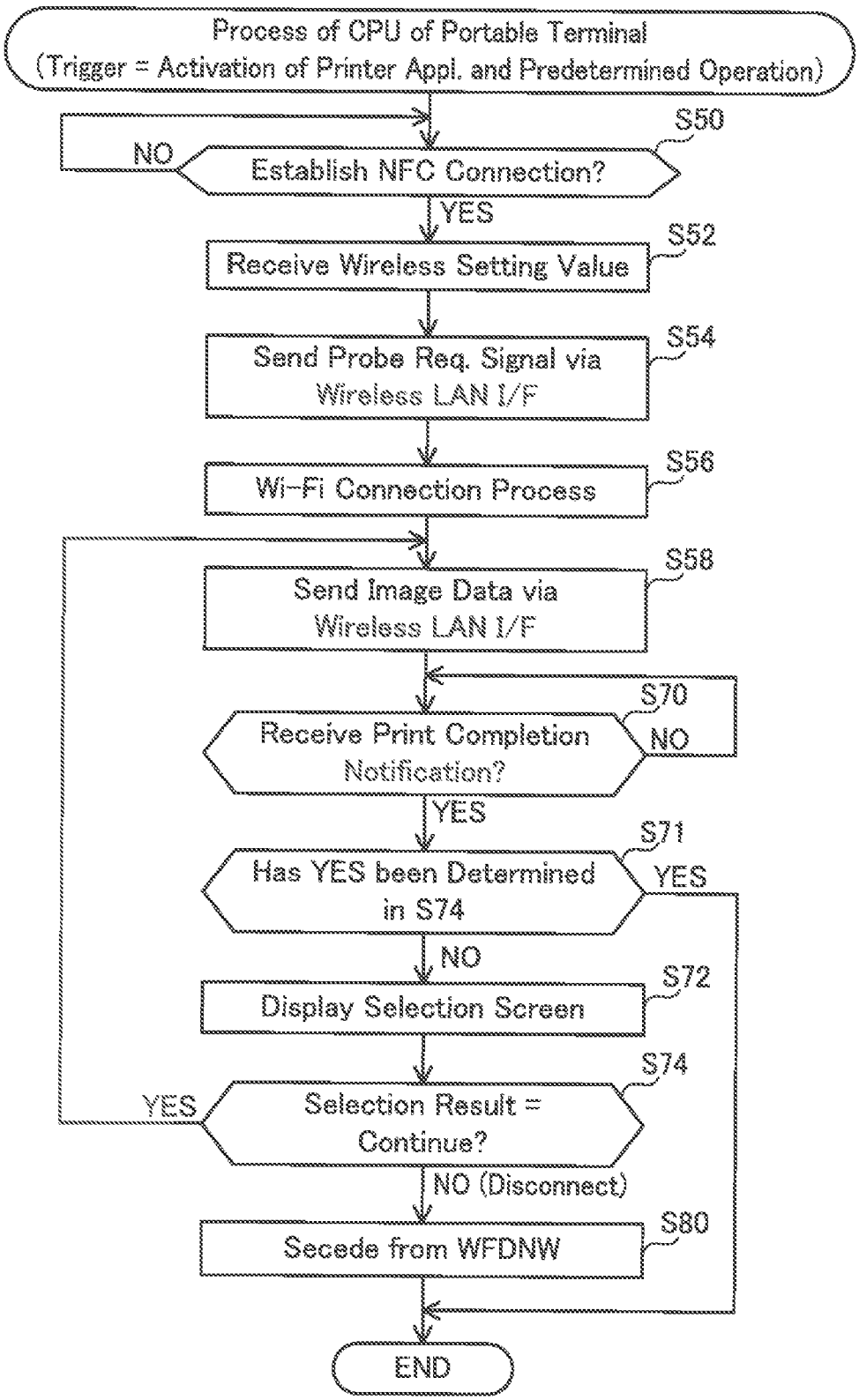
FIG. 11 illustrates a flowchart of a process of a CPU of a portable terminal of a modification.

In the first and second embodiments, the portable terminal 50 performs the determination of S74 of FIG. 3 and FIG. 6 each time of sending image data to the printer 10. Instead, as shown in FIG. 11, after sending image data of a first time to the printer 10 (S58), in case of determining that the disconnection condition is not satisfied (YES in S74), the CPU72 of the portable terminal 50 may determine YES in S71, and continue to maintain the Wi-Fi connection without performing the determination of S74 after sending image data of a second time and subsequent times to the printer 10. That is, the "communication apparatus" need not again determine whether or not the apparatus-side disconnection condition is satisfied after second image data has been sent.

(Modification 5)

In the second embodiment, the printer 10 performs the determination of S21 of FIG. 5 each time image data is received from the portable terminal 50. Instead, as shown in FIG. 12, after receiving image data of a first time from the portable terminal 50 (S18A), in case of determining that the disconnection condition is not satisfied (YES in S21), the CPU32 of the printer 10 may determine YES in S21A, and continue to maintain the Wi-Fi connection after receiving image data of a second time and subsequent times from the portable terminal 50 without performing the determination of S21 until the portable terminal 50 secedes from the WFDNW. That is, "printer" need not again determine whether or not the printer-side disconnection condition is satisfied after the second image data has been received.

(Modification 6)

In the first embodiment, the print completion notification may not be sent from the printer 10 to the portable terminal 50. In this case, in FIG. 3, after performing S58 the portable terminal 50 may perform S72 without performing S70. That is, "communication apparatus" need not receive the predetermined notification.

(Modification 7)

In FIG. 5 of the second embodiment, the printer 10 performs the determination of S21 after the print is completed (i.e., after ending S20). Instead, the printer 10 may perform the determination of S21 before the print is completed. That is, "printer" may determine whether the printer-side disconnection condition is satisfied before the print of the first image is completed.

(Modification 8)

In S12 of FIG. 2 and FIG. 5, the printer 10 forms a wireless network by transiting to the G/O state of the WFD standard. Instead, by activating a so-called SoftAP, the printer 10 may form a wireless network in which the printer 10 operates as an AP. In the present modification, the AP realized by the SoftAP is an example of "parent station".

(Modification 9)

"First wireless communication interface" is not limited to an I/F for performing an NFC communication, but may be an I/F for performing, e.g., a BlueTooth (registered trademark) communication, TransferJet communication, infrared communication, etc. Further, "second wireless interface" is not limited to an I/F for performing a Wi-Fi communication, but may be an I/F for performing, e.g., a BlueTooth (registered trademark) communication.

(Modification 10)

"Communication apparatus" is not limited to the portable terminal 50, but may be a printer, scanner, copier, multi-function peripheral, PC, server, etc. Further, "printer" may further comprise not only a print function, but also a scan function, FAX function, telephone function, etc.

(Modification 11)

In the first and second embodiments, the processes of FIG. 2 to FIG. 7 are realized by the CPU 32 of the printer 10 or the CPU 72 of the portable terminal 50 performing a program (i.e., software). Instead, at least one of the processes of FIG. 2 to FIG. 7 may be realized by hardware such as a logic circuit.

What is claimed is:

1. A non-transitory computer-readable recording medium storing computer-readable instructions for a communication apparatus, the computer-readable instructions, when executed by a processor of the communication apparatus, causing the communication apparatus to perform:

communicating a first wireless setting value with a printer via a first wireless communication interface of the communication apparatus;

establishing a wireless connection with the printer via a second wireless communication interface of the communication apparatus using the first wireless setting value, the second wireless communication interface being different from the first wireless communication interface;

sending first image data representing a first image of a print target to the printer via the second wireless communication interface using the wireless connection that has been established using the first wireless setting value which had been communicated with the printer via the first wireless communication interface;

receiving, after the first image data is sent to the printer via the second wireless communication interface using the wireless connection that has been established using the first wireless setting value which had been communicated with the printer via the first wireless communication interface, a print completion notification from the printer via the second wireless communication interface using the wireless connection that has been established using the first wireless setting value, the print completion notification indicating that a print of the first image is completed by the printer, and the print completion notification being sent from the printer after the print of the first image has been completed by the printer;

controlling, after the first image data is sent to the printer via the second wireless communication interface using the wireless connection that has been established using the first wireless setting value which had been communicated with the printer via the first wireless communication interface, a display unit of the communication apparatus to display an instruction screen for receiving a user instruction as to whether the wireless connection of the second wireless communication interface with the printer via the second wireless communication interface is to be disconnected;

disconnecting the wireless connection of the second wireless communication interface that has been established using the first wireless setting value which had been communicated with the printer via the first wireless communication interface in a case where the print completion notification is received from the printer and an instruction is received in the instruction screen that the wireless connection of the second wireless communication interface with the printer via the second wireless communication interface is to be disconnected; and communicating, after the wireless connection of the second wireless communication interface that has been established using the first wireless setting value which had been communicated with the printer via the first wireless communication interface is disconnected, a second wireless setting value with a printer via the first wireless communication interface.

2. The non-transitory computer-readable recording medium as in claim 1, wherein the second wireless setting value is different from the first wireless setting value.

3. The non-transitory computer-readable recording medium as in claim 1, wherein the first wireless communication interface is configured to execute a wireless communication according to a Bluetooth (Registered Trademark) scheme.

4. The non-transitory computer-readable recording medium as in claim 1, wherein the first wireless communication interface is configured to execute a Near Field Communication (NFC) scheme.

5. The non-transitory computer-readable recording medium as in claim 1, wherein the first wireless setting value includes a first Service Set Identifier (SSID).

6. The non-transitory computer-readable recording medium as in claim 5, wherein the second wireless setting value includes a second Service Set Identifier (SSID).

7. The non-transitory computer-readable recording medium as in claim 6, wherein the second SSID is different from the first SSID.

8. A method executed by a communication apparatus, the method comprising:
communicating a first wireless setting value with a printer via a first wireless communication interface of the communication apparatus;
establishing a wireless connection with the printer via a second wireless communication interface of the communication apparatus using the first wireless setting value, the second wireless communication interface being different from the first wireless communication interface;
sending first image data representing a first image of a print target to the printer via the second wireless communication interface using the wireless connection that has been established using the first wireless setting value which had been communicated with the printer via the first wireless communication interface;
receiving, after the first image data is sent to the printer via the second wireless communication interface using the wireless connection that has been established using the first wireless setting value which had been communicated with the printer via the first wireless communication interface, a print completion notification from the printer via the second wireless communication interface using the wireless connection that has been established using the first wireless setting value, the print completion notification indicating that a print of the first image is completed by the printer, and the print completion notification being sent from the printer after the print of the first image has been completed by the printer;
controlling, after the first image data is sent to the printer via the second wireless communication interface using the wireless connection that has been established using the first wireless setting value which had been communicated with the printer via the first wireless communication interface, a display unit of the communication apparatus to display an instruction screen for receiving a user instruction as to whether the wireless connection of the second wireless communication interface with the printer via the second wireless communication interface is to be disconnected;
disconnecting the wireless connection of the second wireless communication interface that has been established using the first wireless setting value which had been communicated with the printer via the first wireless communication interface in a case where the print completion notification is received from the printer and an instruction is received in the instruction screen that the wireless connection of the second wireless communication interface with the printer via the second wireless communication interface is to be disconnected; and
communicating, after the wireless connection of the second wireless communication interface that has been established using the first wireless setting value which had been communicated with the printer via the first wireless communication interface is disconnected, a second wireless setting value with a printer via the first wireless communication interface.

9. The method as in claim 8, wherein the second wireless setting value is different from the first wireless setting value.

10. The method as in claim 8, wherein the first wireless communication interface is configured to execute a wireless communication according to a Bluetooth (Registered Trademark) scheme.

11. The method as in claim 8, wherein the first wireless communication interface is configured to execute a Near Field Communication (NFC) scheme.

12. The method as in claim 8, wherein the first wireless setting value includes a first Service Set Identifier (SSID).

13. The method as in claim 12, wherein the second wireless setting value includes a second Service Set Identifier (SSID).

14. The method as in claim 13, wherein the second SSID is different from the first SSID.

15. A communication apparatus comprising:
a first wireless communication interface;
a second wireless communication interface which is different from the first wireless communication interface;
a display unit;
a processor; and
a memory storing computer-readable instructions therein, the computer-readable instructions, when executed by the processor, causing the communication apparatus to perform:
communicating a first wireless setting value with a printer via the first wireless communication interface;
establishing a wireless connection with the printer via the second wireless communication interface using the first wireless setting value;
sending first image data representing a first image of a print target to the printer via the second wireless communication interface using the wireless connection that has been established using the first wireless setting value which had been communicated with the printer via the first wireless communication interface;
receiving, after the first image data is sent to the printer via the second wireless communication interface using the wireless connection that has been established using the first wireless setting value which had been communicated with the printer via the first wireless communication interface, a print completion notification from the printer via the second wireless communication interface using the wireless connection that has been established using the first wireless setting value, the print completion notification indicating that a print of the first image is completed by the printer, and the print completion notification being sent from the printer after the print of the first image has been completed by the printer;
controlling, after the first image data is sent to the printer via the second wireless communication interface using the wireless connection that has been established using the first wireless setting value which had been communicated with the printer via the first wireless communication interface, the display unit to display an instruction screen for receiving a user instruction as to whether the wireless connection of the second wireless communication interface with the printer via the second wireless communication interface is to be disconnected;

disconnecting the wireless connection of the second wireless communication interface that has been established using the first wireless setting value which had been communicated with the printer via the first wireless communication interface in a case where the print completion notification is received from the printer and an instruction is received in the instruction screen that the wireless connection of the second wireless communication interface with the printer via the second wireless communication interface is to be disconnected; and communicating, after the wireless connection of the second wireless communication interface that has been established using the first wireless setting value which had been communicated with the printer via the first wireless communication interface is disconnected, a second wireless setting value with a printer via the first wireless communication interface.

16. The communication apparatus as in claim 15, wherein the second wireless setting value is different from the first wireless setting value.

17. The communication apparatus as in claim 15, wherein the first wireless communication interface is configured to execute a wireless communication according to a Bluetooth (Registered Trademark) scheme.

18. The communication apparatus as in claim 15, wherein the first wireless communication interface is configured to execute a Near Field Communication (NFC) scheme.

19. The communication apparatus as in claim 15, wherein the first wireless setting value includes a first Service Set Identifier (SSID).

20. The communication apparatus as in claim 19, wherein the second wireless setting value includes a second Service Set Identifier (SSID).

* * * * *